(12) United States Patent
Hair

(10) Patent No.: US 7,418,189 B2
(45) Date of Patent: Aug. 26, 2008

(54) METHOD AND SYSTEM FOR MANIPULATION OF AUDIO OR VIDEO SIGNALS

(75) Inventor: Arthur R. Hair, Upper St. Clair, PA (US)

(73) Assignee: DMT Licensing, LLC, Wilmington, New Castle, DE (US)

( * ) Notice: Subject to any disclaimer, the term of this patent is extended or adjusted under 35 U.S.C. 154(b) by 534 days.

(21) Appl. No.: 10/820,995

(22) Filed: Apr. 8, 2004

(65) Prior Publication Data

US 2005/0038535 A1 Feb. 17, 2005

Related U.S. Application Data

(62) Division of application No. 09/469,802, filed on Dec. 22, 1999, now Pat. No. 6,721,491, and a division of application No. 08/811,266, filed on Mar. 4, 1997, now Pat. No. 6,014,491.

(51) Int. Cl.
*H04N 7/00* (2006.01)
*H04N 5/93* (2006.01)

(52) U.S. Cl. .......................................... 386/46; 386/52

(58) Field of Classification Search .................. 386/31, 386/109, 111, 112, 46, 107, 117, 52
See application file for complete search history.

(56) References Cited

U.S. PATENT DOCUMENTS 5,587,928 A * 12/1996 Jones et al. ................. 709/204

* cited by examiner

*Primary Examiner*—Robert Chevalier
(74) *Attorney, Agent, or Firm*—Ansel M. Schwartz

(57) ABSTRACT

The present invention pertains to an apparatus for manipulating video or audio signals. The apparatus includes a mechanism for analyzing a video or audio signal having a size. The apparatus includes a mechanism for producing a representative signal from and corresponding to the audio or video signal that identifies the audio or video signal but has less information than the audio or video signal and is smaller in size than the size of the audio or video signal. The producing mechanism is connected to the analyzing means. The apparatus includes a mechanism for transmitting to a remote location the representative signal. The transmitting mechanism is connected to the producing mechanism. The apparatus comprises a mechanism for recreating the audio or video signal from the representative signal at the remote location. The recreating mechanism is connected to the transmitting mechanism.

8 Claims, 13 Drawing Sheets

FIG. 16

| pixel | $F_1$ | $F_2$ | $F_3$ | $F_4$ | $F_5$ | $F_6$ | $F_7$ | $F_8$ |
|---|---|---|---|---|---|---|---|---|
| $h_{11}l_{20}$ | | $R_{233}G_{228}B_{000}$ | $R_{233}G_{228}B_{000}$ | $R_{233}G_{228}B_{000}$ | $R_{233}G_{228}B_{000}$ | $R_{233}G_{228}B_{000}$ | $R_{233}G_{228}B_{000}$ | $R_{233}G_{228}B_{000}$ |
| $h_4 l_7$ | | $R_{074}G_{255}B_{000}$ | $R_{074}G_{255}B_{000}$ | $R_{074}G_{255}B_{000}$ | $R_{074}G_{255}B_{000}$ | $R_{142}G_{195}B_{232}$ | $R_{142}G_{195}B_{232}$ | $R_{142}G_{195}B_{232}$ |
| $h_1 l_1$ | $R_{116}G_{000}B_{095}$ | $R_{116}G_{000}B_{095}$ | $R_{116}G_{000}B_{095}$ | $R_{116}G_{000}B_{095}$ | $R_{116}G_{000}B_{095}$ | $R_{116}G_{000}B_{095}$ | $R_{000}G_{140}B_{118}$ | $R_{000}G_{140}B_{118}$ |

VIDEO FRAMES

FIG. 17

| pixel | $F_1$ | $F_2$ | $F_3$ | $F_4$ | $F_5$ | $F_6$ | $F_7$ | $F_8$ |
|---|---|---|---|---|---|---|---|---|
| $h_{11}l_{20}$ | | $R_{233}G_{228}B_{000}$ | $R_{233}G_{228}B_{000}$ | $R_{233}G_{228}B_{000}$ | $R_{233}G_{228}B_{000}$ | $R_{233}G_{228}B_{000}$ | $R_{233}G_{228}B_{000}$ | $R_{233}G_{228}B_{000}$ |
| $h_4 l_7$ | | $R_{074}G_{255}B_{000}$ | $R_{074}G_{255}B_{000}$ | $R_{074}G_{255}B_{000}$ | $R_{074}G_{255}B_{000}$ | $R_{142}G_{195}B_{232}$ | $R_{142}G_{195}B_{232}$ | $R_{142}G_{195}B_{232}$ |
| $h_1 l_1$ | $R_{116}G_{000}B_{095}$ | $R_{116}G_{000}B_{095}$ | $R_{116}G_{000}B_{095}$ | $R_{116}G_{000}B_{095}$ | $R_{116}G_{000}B_{095}$ | $R_{116}G_{000}B_{095}$ | $R_{000}G_{140}B_{118}$ | $R_{000}G_{140}B_{118}$ |

VIDEO FRAMES

VIDEO FRAMES: $F_1, F_2, F_3, F_4, F_5, F_6, F_7, F_8$

FIG.19

$h_{11}l_{20}$: $R_{233}G_{228}B_{000}$ across $F_1$–$F_5$, then $R_{142}G_{195}B_{232}$ at $F_6$, $R_{233}G_{228}B_{000}$ at $F_7, F_8$ $h_4l_7$: $R_{074}G_{255}B_{000}$ at $F_1, F_2$, $R_{233}G_{228}B_{000}$ at $F_3, F_4$, $R_{074}G_{255}B_{000}$ at $F_5$, $R_{142}G_{195}B_{232}$ at $F_6, F_7$, $R_{142}G_{195}B_{232}$ at $F_8$ $h_1l_1$: $R_{116}G_{000}B_{095}$ across $F_1$–$F_7$, $R_{000}G_{140}B_{118}$ at $F_8$

VIDEO FRAMES: $F_1, F_2, F_3, F_4, F_5, F_6, F_7, F_8$

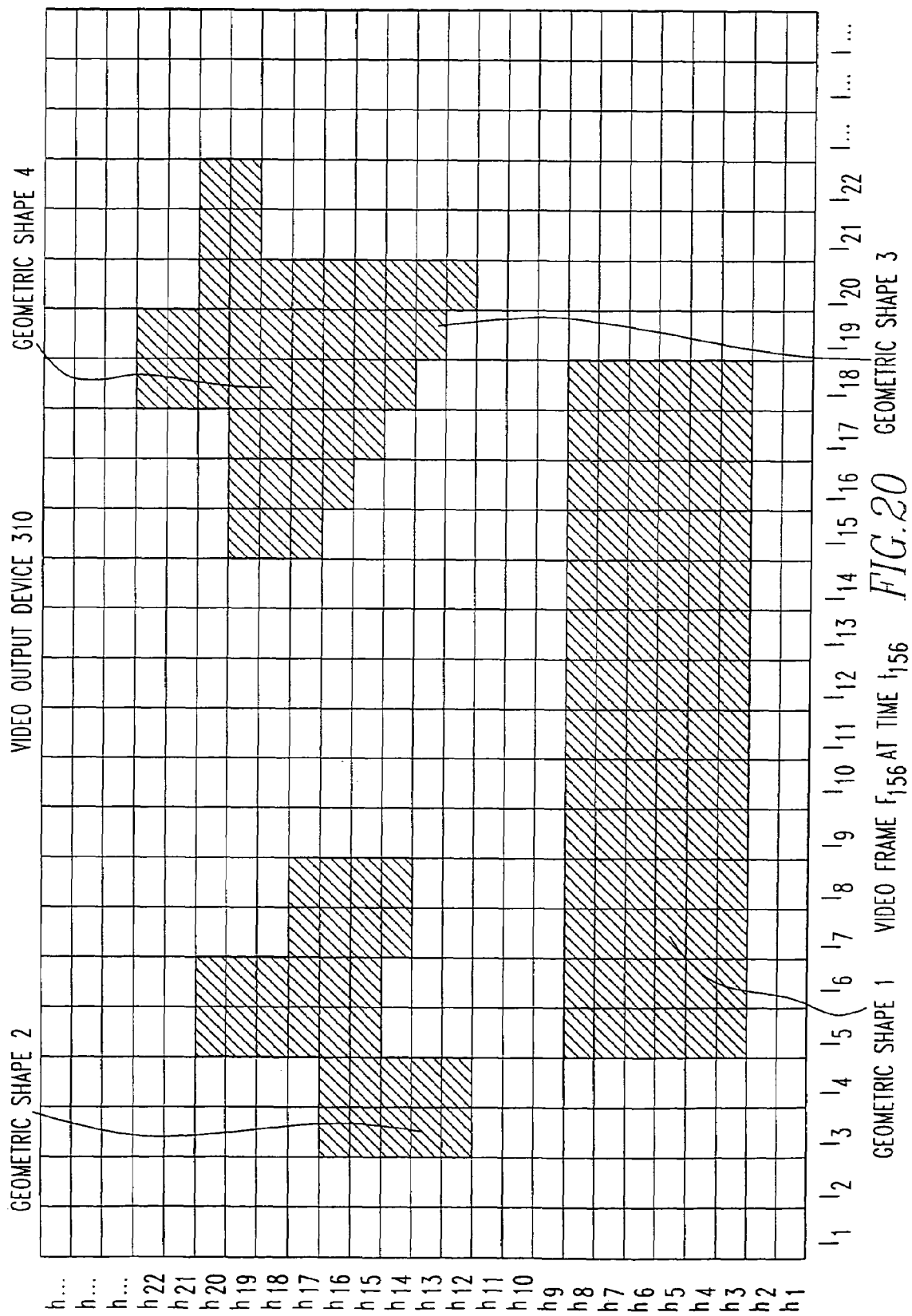

METHOD AND SYSTEM FOR MANIPULATION OF AUDIO OR VIDEO SIGNALS

This application is a divisional of applications application Ser. No. 09/469,802 filed on Dec. 22, 1999 now U.S. Pat. No. 6,721,491. application Ser. No. 08/811,266 filed on Mar. 4, 1997 now U.S. Pat. No. 6,014,491.

FIELD OF THE INVENTION

The present invention is related to a method and system to compress, and/or convert, audio and video signals, or files, into a static file format, and more particularly to a method and system to playback, and/or replicate, static audio files using a static audio player; and/or to playback, and/or replicate, static video files using a static video player.

BACKGROUND OF THE INVENTION

Generally, computer file formats for digital audio (hereinafter referred to as a "Dynamic Audio File"), such as the AUI, WAV, etc. audio file formats, and digital video (hereinafter referred to as a "Dynamic Video File"), such as the MPEG video file format, are formatted in a dynamic manner permitting easy and routine editing, serving a very useful purpose in the music and movie industries. Unfortunately, the dynamic nature of these file formats results in the generation of very large computer file sizes (i.e. hundreds of millions of bytes in size for a 40 minute digital audio file of 44.1 kHz sound quality and multi Gigabytes of data for full length motion picture quality recordings in digital video form).

As example, each second of a CD quality Dynamic Audio File is divided into 44,100 discrete time intervals. Each of these time intervals can simultaneously contain multiple frequencies (i.e. pitch) of sound at multiple amplitudes (i.e. volume). The Dynamic Audio File instructs an audio playing device (hereinafter referred to as a "Dynamic Audio Player") to play discrete frequencies/amplitudes at a rate of 44,100 times per second for CD quality sound. In a Dynamic Audio File, even if a string of consecutive time intervals contains identical frequencies and their related amplitudes, such an occurrence is irrelevant since the Digital Audio File format was designed, in part, to enable specific editing and/or dynamic manipulation of each individual time interval. The Dynamic Audio File fails to take advantage of redundancies within a string of consecutive time intervals which happen to repeat one or more identical frequencies and their related amplitudes.

Additionally, motion picture quality Digital Video Files are generally composed of about 30 video frames (images) per second. Each of these video frames are composed of a two dimensional, usually rectangular or square, grid of pixels. Each such pixel is capable of being colorized by complex, and/or basic, colors. Usually, a complex color is generated by mixing distinct shades of the basic colors red, green, and blue. The greater the number of distinct shades of these three basic colors, the greater the color definition of the video recording. It is common practice to use 256 distinct shades of the basic colors red, green, and blue in combination to create a palette of 16,777,216 unique complex colors, which is more than enough complex colors to display a motion picture quality recording. As example, each pixel contains a numeric entry ranging from 000 to 255 to define a distinct shade of the basic color red, a numeric entry ranging from 000 to 255 to define a distinct shade of the basic color green, and a numeric entry ranging from 000 to 255 to define a distinct shade of the basic color blue, all three of these shades of the basic colors red, green, and blue combine to identify a specific complex color from the palette of 16,777,216 possible complex colors (i.e. 256×256×256=16,777,216). Furthermore, the complex color white is defined, as is customary, as the mixture of the basic colors $red_{255}$, $green_{255}$, and $blue_{255}$, where the subscript defines the distinct shade; and the complex color black is defined, as is customary, as the mixture of the basic colors $red_{000}$, $green_{000}$, and $blue_{000}$. Using this manner to mathematically describe complex colors, $red_{116}$, $green_{000}$, and $blue_{095}$ mix to generate a discrete shade of purple. This manner to mathematically describe complex colors will be used throughout the teachings of the present invention.

The Dynamic Video File instructs a video playing device (hereinafter referred to as the "Dynamic Video Player") to display specific complex colors within each discrete pixel of each discrete video frame video frame of the video recording. In a Dynamic Video File, even if a string of consecutive video frames contains a pixel having the identical complex color, such a coincidence is irrelevant since the Digital Video File format was designed, in part, to enable very specific and independent editing or dynamic manipulation of each individual discrete pixel within each discrete video frame. The Dynamic Video File format fails to take advantage of similarities or redundancies within a string of consecutive video frames in which the color within discrete pixels remains constant over time.

Furthermore, use of the Dynamic Audio File and Dynamic Video File formats pose several problems when used to electronically distribute digital audio and digital video signals to the consumer markets (i.e. U.S. Pat. No. 5,191,573). The Dynamic Audio File and the Dynamic Video File formats, being very large as measured in bytes of data, require considerable time to transmit via telecommunications. Additionally, and as example, if the user desires to save Dynamic Audio Files in the home, a massive storage device would be required (i.e. 10 music albums of about 45 minutes in duration each, in AUI format, would require in excess of 7 Giga bytes of storage capacity).

SUMMARY OF THE INVENTION

The present invention offers a new and improved method and system to encode audio and video files in a static format for playback utilizing a static player. The static format takes advantage of consecutive redundancies within Dynamic Audio Files and Dynamic Video Files, with respect to time.

A static audio file (hereinafter referred to as the "Static Audio File") is encoded in a format which records a plurality of discrete frequency/amplitude (sound) information to be played, and/or replicated, on an audio output device, and the related starting points each such frequency/amplitude is to be played, and/or replicated, for one or more consecutive time interval, with respect to time. The Static Audio File provides instructions enabling a audio playing device (hereinafter referred to as the "Static Audio Player") to save, and/or replace, such frequency/amplitude information in a matrix of memory registers within the Static Audio Player. Upon instruction from the user, the Static Audio Player will commence the playback process whereby each such frequency/amplitude, generated from each such memory register, will commence to be played on an audio output device, commencing with a discrete time interval. The Static Audio Player continues to play, and/or replicate, each such frequency/amplitude, generated from each such memory register, on an audio output device in each subsequent time interval (generally about 44,100 time intervals per second for CD quality sound), without further instruction from the Static Audio File.

If, and/or when, the Static Audio Player receives subsequent instructions from the Static Audio File to update the frequency/amplitude information in any such memory register with new frequency/amplitude information corresponding with a specific time interval, then the Static Audio Player will then play, and/or replicate, such new frequency/amplitude, generated from any such updated memory register, on an audio output device starting with a subsequent time interval.

A static video file (hereinafter referred to as the "Static Video File") is encoded in a format which records color information to be displayed, and/or replicated, within discrete pixels on a video output device, and the related starting points each such color is to be displayed, and/or replicated, within each such pixel, for one or more consecutive video frames, with respect to time. The Static Video File provides instructions enabling a video playing device (hereinafter referred to as the "Static Video Player") to save, and/or replace, such color information in a matrix of memory registers within the Static Video Player. Upon instruction from the user, the Static Video Player will commence the playback process whereby each such color, generated from each such memory register, will commence to be displayed within the corresponding pixel on a video output device, commencing with a discrete video frame. The Static Video Player continues to display, and/or replicate, each such color, generated from each such memory register, within each such pixel on a video output device in each subsequent video frame (generally about 30 video frames per second for full motion video), without further instruction from the Static Video File. If, and/or when, the Static Video Player receives subsequent instructions from the Static Video File to update the color information in any such memory register with new color information corresponding with a specific video frame, then the Static Video Player will then display, and/or replicate, such new color, generated from any such updated memory register, within the corresponding pixel on a video output device starting with a subsequent video frame.

The present invention pertains to a method for manipulating video or audio signals. The method comprises the steps of analyzing a video or audio signal having information and a size. Then there is the step of producing a representative signal from and corresponding to the audio or video signal that identifies the audio or video signal but has less information than the audio or video signal such that the audio or video signal cannot be produced from the representative signal itself and is smaller in size than the size of the audio or video signal. Next there is the step of transmitting to a remote location the representative signal. Then there is the step of recreating the audio or video signal from the representative signal at the remote location.

The present invention pertains to an apparatus for manipulating video or audio signals. The apparatus comprises means or a mechanism for analyzing a video or audio signal having a size. The apparatus comprises means or a mechanism for producing a representative signal from and corresponding to the audio or video signal that identifies the audio or video signal but has less information than the audio or video signal and is smaller in size than the size of the audio or video signal. The producing means or mechanism is connected to the analyzing means or mechanism. The apparatus comprises means or a mechanism for transmitting to a remote location the representative signal. The transmitting means or mechanism is connected to the producing means or mechanism. The apparatus comprises means or a mechanism for recreating the audio or video signal from the representative signal at the remote location. The recreating means or mechanism is connected to the transmitting means or mechanism.

BRIEF DESCRIPTION OF THE DRAWINGS

In the accompanying drawings, the preferred embodiment of the invention and preferred methods of practicing the invention are illustrated in which:

FIG. 16 is a graphical representation of a Dynamic Video File 260 which recorded color information to be displayed in pixels $h_1l_1$, $h_4l_7$, and $h_{11}l_{20}$ on a video output device.

FIG. 17 is a graphical representation of the playback output of a Dynamic Video File 260 by a Dynamic Video Player 270 which displays color information in pixels $h_1l_1$, $h_4l_7$, and $h_{11}l_{20}$ on a video output device.

FIG. 18 is a graphical representation of a Static Video File 310 which recorded color information to be displayed in pixels $h_1l_1$, $h_4l_7$, and $h_{11}l_{20}$ on a Video Output Device 390.

FIG. 19 is a graphical representation of the playback output of a Static Video File 310 by a Static Video Player 320 which displays color information in pixels $h_1l_1$, $h_4l_7$, and $h_{11}l_{20}$ on a Video Output Device 390.

FIG. 20 is a graphical representation of the playback output of a Static Video File 310 by a Static Video Player 320 which displays color information on a Video Output Device 390, said playback displaying geometric shapes mathematically defined by, and with corners located at, pixels $h_3l_5$, $h_3l_{18}$, $h_8l_{18}$, and $h_8l_5$ (Geometric Shape 1); and $h_{12}l_3$, $h_{12}l_4$, $h_{15}l_4$, $h_{15}l_7$, $h_{14}l_7$, $h_{14}l_8$, $h_{17}l_8$, $h_{17}l_6$, $h_{20}l_6$, $h_{20}l_5$, $h_{16}l_5$, and $h_{16}l_3$ (Geometric Shape 2); and $h_{12}l_{20}$, $h_{19}l_{20}$, $h_{19}l_{22}$, $h_{20}l_{22}$, $h_{20}l_{19}$, $h_{22}l_{19}$, $h_{22}l_{18}$, $h_{19}l_{18}$, $h_{19}l_{15}$, and $h_{17}l_{15}$ (Geometric Shape 3); and $t_{56}$ (Geometric Shape 4).

DESCRIPTION OF THE PREFERRED EMBODIMENT

Figure 1:
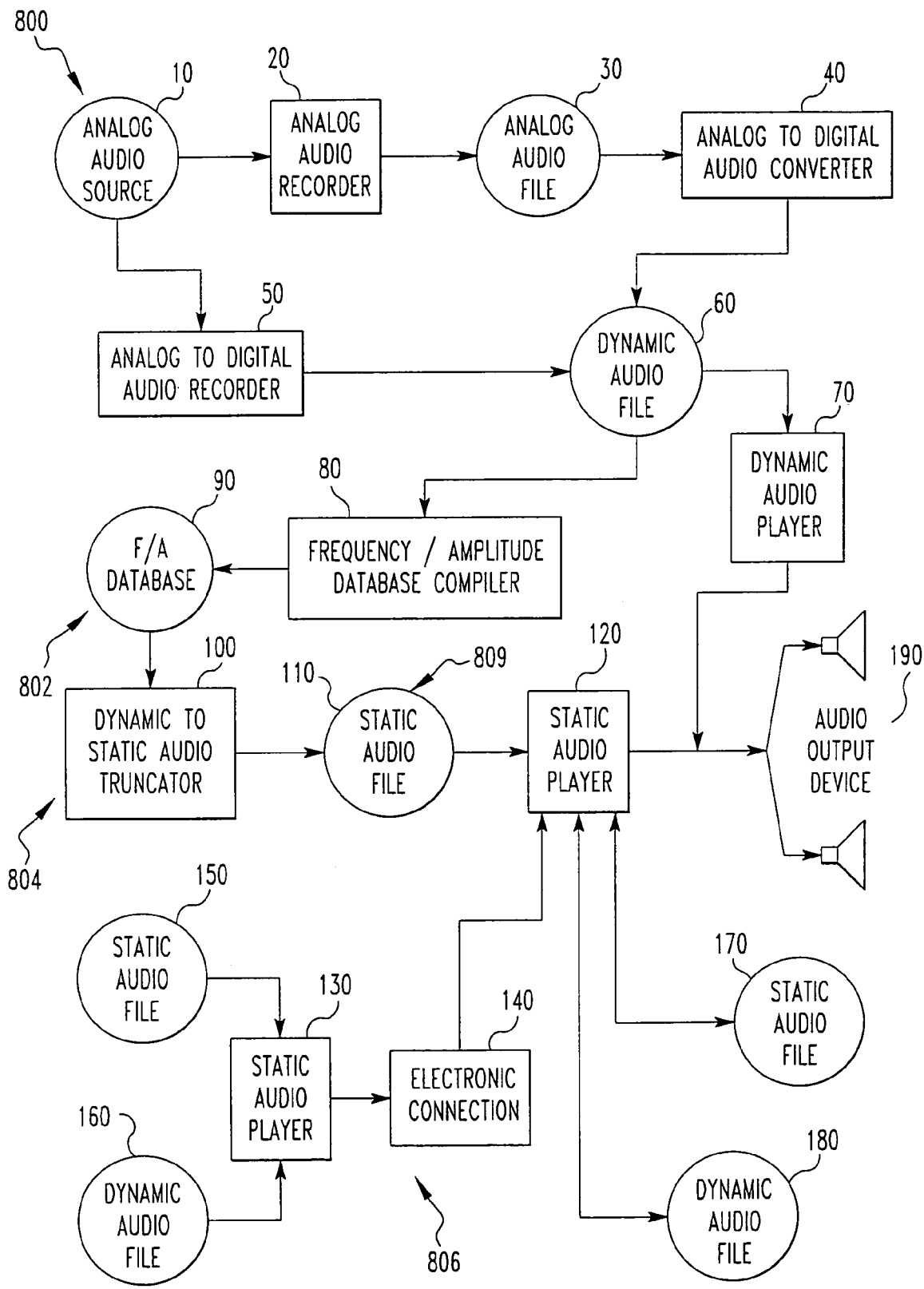
FIG. 1 is a pictorial flow chart which may be used in carrying out the teachings of this invention for the purpose of converting Dynamic Audio Files into Static Audio Files, and playback of such Static Audio Files by means of a Static Audio Player, and conversion of Static Audio Files to Dynamic Audio Files by means of a Static Audio Player.
Figure 3:
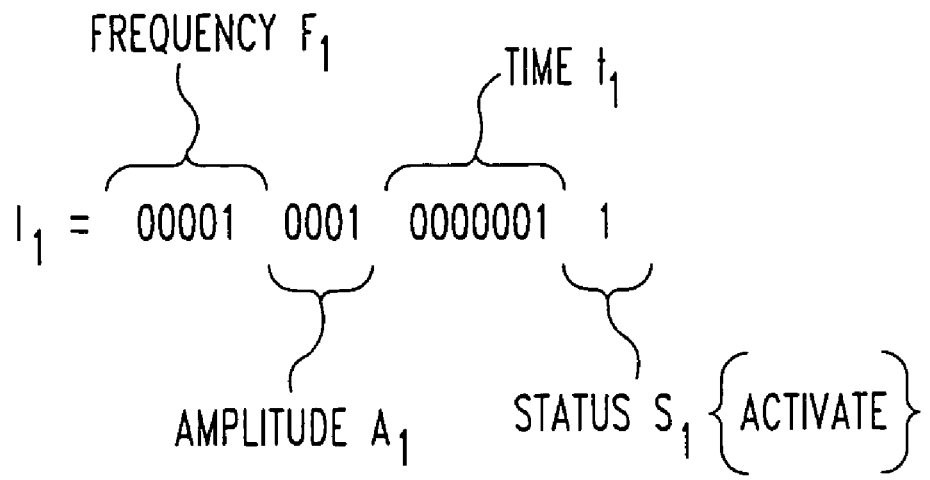
FIG. 3 is computer algorithm which details one possible configuration of the computer file format for the Static Audio File.

Referring now to the drawings wherein like reference numerals refer to similar or identical parts throughout the several views, and more specifically to FIGS. 1 and 3 thereof, there is shown an apparatus 800 for manipulating video or audio signals. The apparatus comprises means or a mechanism 802 for analyzing a video or audio signal having a size. The apparatus comprises means or a mechanism 804 for producing a representative signal from and corresponding to the audio or video signal that identifies the audio or video signal but has less information than the audio or video signal and is smaller in size than the size of the audio or video signal. The producing means or mechanism is connected to the analyzing means or mechanism. The apparatus comprises means or a mechanism 806 for transmitting to a remote location the representative signal. The transmitting means or mechanism is connected to the producing means or mechanism. The apparatus comprises means or a mechanism 809 for recreating the audio or video signal from the representative signal at the remote location. The recreating means or mechanism is connected to the transmitting means or mechanism 806.

The present invention pertains to a method for manipulating video or audio signals. The method comprises the steps of analyzing a video or audio signal having information and a size. Then there is the step of producing a representative signal from and corresponding to the audio or video signal that identifies the audio or video signal but has less information than the audio or video signal such that the audio or video signal cannot be produced from the representative signal itself and is smaller in size than the size of the audio or video signal. Next there is the step of transmitting to a remote location the representative signal. Then there is the step of recreating the audio or video signal from the representative signal at the remote location.

The analyzing means or mechanism 802 can include a frequency/amplitude database compiler 80, or a red/green/blue database compiler 280. The producing means or mechanism 804 can include a dynamic to static audio truncator 100, or a dynamic to static video truncator 300. The transmitting means or mechanism 806 can include a transmitter or modem and a telecommunication connection. The recreating means or mechanism 809 can include a static audio file 110 and a sound card and a static audio player 120 and an audio output device 190, or a static video file 310 and a static video player 320 and a video output device 390.

Referring now to FIG. 1, one preferred embodiment of the invention is comprised of the following:
10 Analog Audio Source
20 Analog Audio Recorder
30 Analog Audio File
40 Analog to Digital Audio Converter
50 Analog to Digital Audio Recorder
60 Dynamic Audio File
70 Dynamic Audio Player
80 Frequency/Amplitude Database Compiler
90 Frequency/Amplitude Database
100 Dynamic to Static Audio Truncator
110 Static Audio File
120 Static Audio Player
130 Static Audio Player
140 Electronic Connection
150 Static Audio File
160 Dynamic Audio File
170 Static Audio File
180 Dynamic Audio File
190 Audio Output Device In FIG. 1, the following components are already commercially available: the Analog Audio Source 10; the Analog Audio Recorder 20; the Analog Audio File 30; the Analog to Digital Audio Converter 40; the Analog to Digital Audio Recorder 50; the Dynamic Audio File 60, 160, and 180; the Dynamic Audio Player 70; the Electronic Connection 140; and the Audio Output Device 190.

The Frequency/Amplitude Database Compiler 80; the Frequency/Amplitude Database 90; the Dynamic to Static Audio Truncator 100; the Static Audio File 110, 150, and 170; and the Static Audio Player 120 and 130; are new teachings of this invention.

The Analog Audio Source 10 is the originating source of audio in the configuration as outlined in FIG. 1.

The Analog Audio Recorder 20 (i.e. cassette tape recorder/player, etc.) is the means by which the Analog Audio Source 10 can be recorded in either analog form or digital form.

The Analog Audio File 30 is the resulting analog file produced by the Analog Audio Recorder 20.

The Analog to Digital Audio Converter 40 is the means by which an Analog Audio File 30 is converted into a digital file format.

The Analog to Digital Audio Recorder 50 is the means by which the Analog Audio Source 10 can be recorded into a digital file format.

The Dynamic Audio File 60 (i.e. AUI, WAV, etc.) is encoded in a digital file format which contains a plurality of frequency/amplitude information by time interval and can be produced by either the Analog to Digital Audio Converter 40 or the Analog to Digital Audio Recorder 50. The Dynamic Audio File 60 is formatted in the same digital audio file format as the Dynamic Audio File 160 and 180.

The Dynamic Audio Player 70 is a means to playback a Dynamic Audio File 60.

Figure 12:
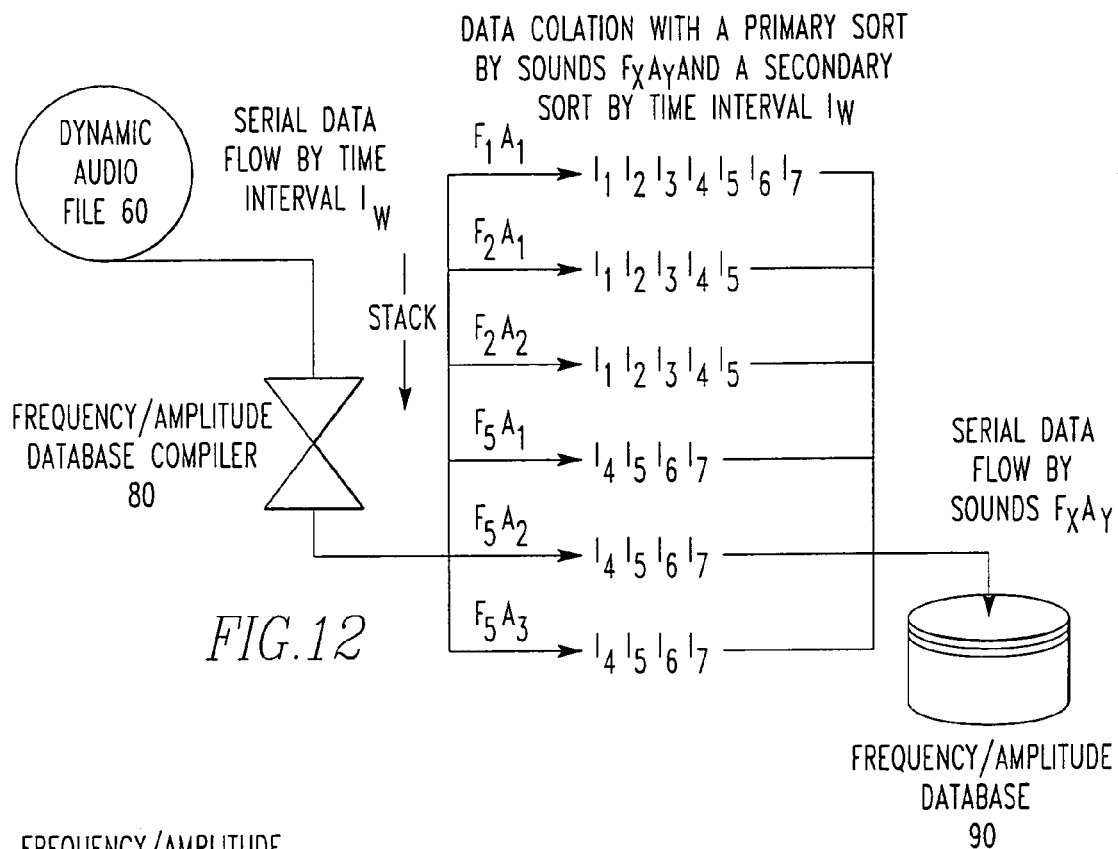
FIG. 12 is a computer flow chart depicting the various functions of the Frequency/Amplitude Database Compiler 80.

The Frequency/Amplitude Database Compiler 80 is the means by which data contained in the Dynamic Audio File 60 is accessed and inputted into the Frequency/Amplitude Database Compiler 80 and is compiled to create the Frequency/Amplitude Database 90. The Frequency/Amplitude Database Compiler 80 is a software program, to be executed on a computer system, which can be written by one skilled in the art of audio database creation (see FIG. 12).

The Frequency/Amplitude Database 90 is the resulting digital database which is composed of three dimensions: frequency, amplitude, and time, and is produced by the Frequency/Amplitude Database Compiler 80. The Frequency/Amplitude Database 90 is a computer file which can be saved on the hard disk of a computer or saved to random access memory, or both.

Figure 13:
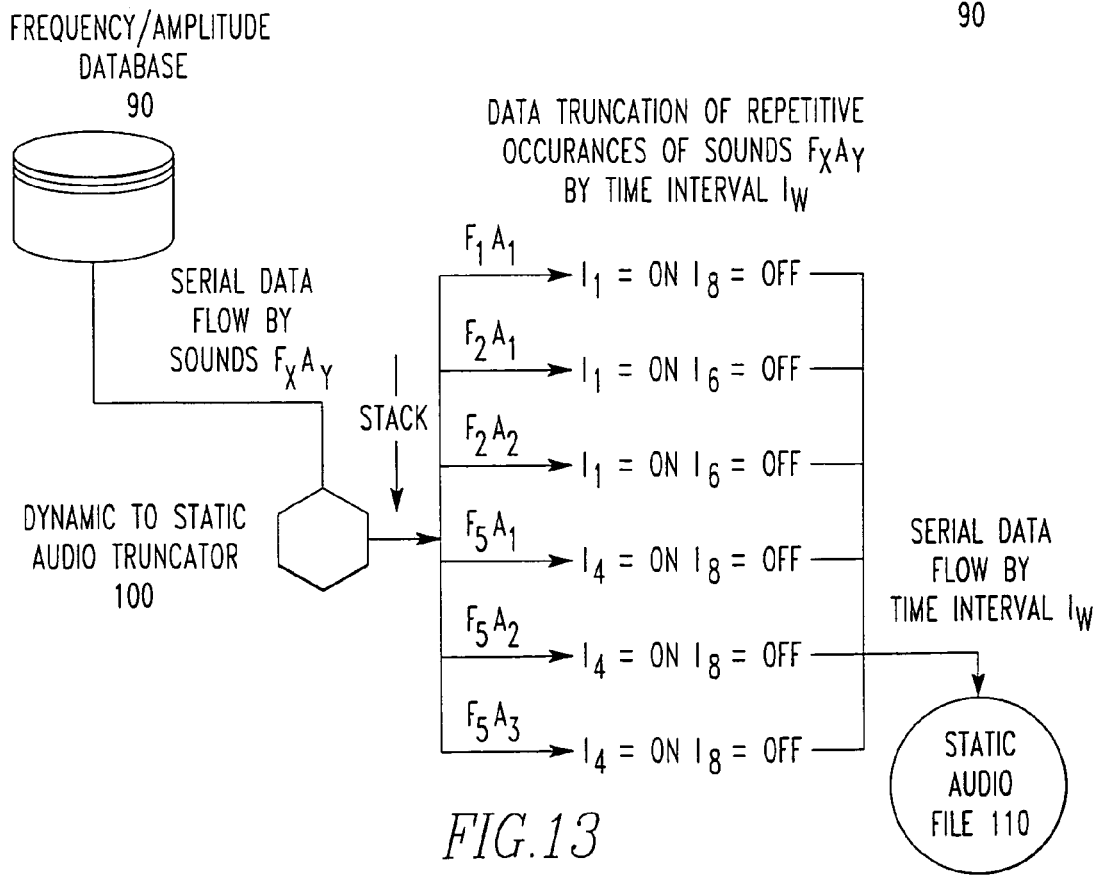
FIG. 13 is a computer flow chart depicting the various functions of the Dynamic to Static Audio Truncator 100.

The Dynamic to Static Audio Truncator 100 is the means by which repetitive data contained in the Frequency/Amplitude Database 90 is truncated to contain only the starting point of such repetition and its ending point, with respect to time, and removes any repetitive data between said starting point and said ending point and creates the Static Audio File 110. The Dynamic to Static Audio Truncator 100 is a software program, to be executed on a conventional computer system, which can be written by one skilled in the art of audio database creation (see FIG. 13).

The Static Audio File 110 is encoded in a digital file format which records a plurality of discrete frequency/amplitude information and their respective starting points and ending points, with respect to time and can be produced by the Dynamic to Static Audio Truncator 100. The Static Audio File 110 is encoded in a format which is compatible for use by the Static Audio Player 120 and/or 130, and can be saved on the hard disk of a conventional computer system. The Static Audio File 110 is formatted in the same digital audio file format as the Static Audio File 150 and 170. The Static Audio File 110 is a computer file which can be saved on the hard disk of a computer or saved to random access memory, or both.

The Static Audio File 110, 150, and/or 170 and the Static Video File 310, 350, and/or 370 may be combined into one file for use by a device which is the combination of the Static Audio Player 120 and the Static Video Player 320.

The Static Audio Player 120 is a computer software program executed by a conventional computer system. The Static Audio Player 120 is a means by which playback of the Static Audio File 110 through the sound card of the host computer system is possible in either digital audio form or analog audio form. The Static Audio Player 120 is designed to process the encoded information of the Static Audio File 110 for subsequent audio playback and/or replication. The Static Audio Player 120 invokes a sequential serial replication (i.e. a serial data replication is the process whereby the original copy of data is replicated, transmitted, and saved in series to a buffer memory) of sound information from the Static Audio File 110 and saves said sound information into a time interval buffer memory within the Static Audio Player 120. Next, the Static Audio Player 120 invokes a sequential parallel data dump of said sound information by time interval from the time interval memory buffer into a matrix of frequency/amplitude memory registers Static Audio Player 120. Next, the Static Audio Player 120 invokes a sequential parallel data replication of the sound information in the frequency/amplitude memory registers to the sound card buffer memory within the Static Audio Player 120. Next, the Static Audio Player 120 invokes a sequential parallel data dump of the sound information in the sound card buffer memory to the sound card of the host computer system, whereupon the sound card relays/transmits the sound information to the Audio Output Device 190. Each amplitude of each frequency is pre-assigned, or corresponds, to a specific frequency/amplitude memory register. The Static Audio Player 120 activates, or deactivates, the memory register corresponding to a discrete frequency/amplitude upon instruction from the Static Audio File 110 (i.e. a binary "1" activates, or is saved into, a frequency/amplitude memory register and a binary "0" deactivates, erases, or is saved into, said frequency/amplitude memory register). If the memory register of a discrete frequency/amplitude has been activated, or contains a binary "1", then the Static Audio Player 120 will playback, and/or replicate, that frequency/amplitude until its memory register has been deactivated, erased, or contains a binary "0". The Static Audio Player 120 may be configured to contain the functionality of the Dynamic Video Player 70, the Frequency/Amplitude Database Compiler 80, and the Dynamic to Static Audio Truncator 100.

The Static Audio Player 120 is also a means to playback a Static Audio File 110, 150, and/or 170 in dynamic digital form on a digital Audio Output Device 190 with playback output being in digital form or (i.e. digital stereo speakers, etc.); or playback in analog form on an analog Audio Output Device 190 (i.e. analog stereo speakers, etc.) for listening by the user. The Static Audio Player 120 can playback the Static Audio File 110, 150, and/or 170 in static digital form to save computational instructions as a Static Audio File 170. The Static Audio Player 120 can playback a Static Audio File 110, 150, and/or 170 in dynamic digital form to save computational instructions as a Dynamic Audio File 180.

Additionally, the Static Audio Player 120 is a means to playback a Dynamic Audio File 160 and/or 180, in dynamic digital form on an Audio Output Device 190 with playback output being in digital form or (i.e. digital stereo speakers, etc.); or playback in analog form on an Audio Output Device 190 (i.e. analog stereo speakers, etc.) for listening by the user. The Static Audio Player 120 can playback the Dynamic Audio File 160 and/or 180, in static digital form to save computational instructions as a Static Audio File 170. The Static Audio Player 120 can playback the Dynamic Audio File 160 and/or 180, in dynamic digital form to save computational instructions as a Dynamic Audio File 180.

Furthermore, the Static Audio Player 120 can receive computational instructions from a Static Audio File 150 or a Dynamic Audio File 160 (i.e. in broadcast fashion, download fashion (i.e. U.S. Pat. No. 5,191,573), etc.) by means of the Static Audio Player 130 via an Electronic Connection 140 (such as, but not limited to, transmission via: direct connect network, satellite, cable TV, coax cable, fiber optics, fiber/coax hybrid, Internet, cellular, microwave, radio, twisted pair telephone, ISDN telephone, T-1 telephone, DS-3 telephone, OC-3 telephone, etc.).

The Static Audio Player 120 and the Static Video Player 320 may be combined into one device enabling the simultaneous playback of recordings which are the combination of the Static Audio File 110, 150, and/or 170 and the Static Video File 310, 350, and/or 370.

The Static Audio Player 130 is a means by which a Static Audio File 150 and/or a Dynamic Audio File 160 may be electronically transmitted (i.e. in broadcast fashion, download fashion (i.e. U.S. Pat. No. 5,191,573), etc.) to the Static Audio Player 120 via an Electronic Connection 140 for subsequent and/or real-time playback.

The Electronic Connection 140 (such as, but not limited to, transmission via: direct connect network, satellite, cable TV, coax cable, fiber optics, fiber/coax hybrid, Internet, cellular, microwave, radio, twisted pair telephone, ISDN telephone, T-1 telephone, DS-3 telephone, OC-3 telephone, etc.) is a means by which a Static Audio Player 130 of a first computer system and a Static Audio Player 120 of a second computer system can be electronically connected. The Static Audio Player 120 and the Static Audio Player 130 may be configured to have all, or some, of the same functionality and capabilities as the other.

The Static Audio File 150 is encoded in a digital file format which records a plurality of discrete frequency/amplitude information and the respective starting points and ending points, with respect to time. The Static Audio File 150 is encoded in a format which is compatible for use by the Static Audio Player 120 and/or 130. The Static Audio File 150 is formatted in the same digital audio file format as the Static Audio File 110 and/or 170.

The Dynamic Audio File 160 (i.e. AUI, WAV, etc.) is encoded in a digital file format which contains a plurality of frequency/amplitude information by time interval. The Dynamic Audio File 160 is formatted in the same digital audio file format as the Dynamic Audio File 60 and/or 180.

The Static Audio File 170 is encoded in a digital file format which records a plurality of discrete frequency/amplitude information and the respective starting points and ending points, with respect to time and can be produced by the Static Audio Player 120. The Static Audio File 170 is encoded in a format which is compatible for use by the Static Audio Player 120 and/or 130. The Static Audio File 170 is formatted in the same digital audio file format as the Static Audio File 110 and/or 150.

The Dynamic Audio File 180 (i.e. AUI, WAV, etc.) is encoded in a digital file format which contains a plurality of frequency/amplitude information by time interval and can be produced by the Static Audio Player 120. The Dynamic Audio File 180 can be formatted in the same digital audio file format as the Dynamic Audio File 60 and/or 160.

The Audio Output Device 190 (i.e. digital and/or analog stereo speakers, etc.) is the means by which sound can be produced, in either digital or analog form, when the Static Audio File 110, 150, and/or 170 or the Dynamic Audio file 160 and/or 180 is played by means of the Static Audio Player 120. The Audio Output Device 190 is electronically connected to, and receives sound information from, a conventional computer sound card. The Audio Output Device 190 can be either a digital device or an analog device.

With respect to FIG. 1, the invention records the Analog Audio Source 10, being any form of audio source, by means of either an Analog Audio Recorder 20 or an Analog to Digital Audio Recorder 50. The Analog Audio Recorder 20 is a device which records, and/or plays, analog audio signals (i.e. cassette tape recorder/player, etc.). If the Analog Audio Recorder 20 is used, an Analog Audio File 30 is produced which is then converted into a Dynamic Audio File 60 by means of Analog to Digital Audio Converter 40. The Analog to Digital Audio Converter 40 is a device which converts analog audio signals into digital audio signals. If an Analog to Digital Audio Recorder 50 is used, a Dynamic Audio File 60 is directly produced. The Analog to Digital Audio Recorder 50 is a device which can convert analog audio signals directly into digital audio signals, can record digital audio signals, and can playback digital audio signals.

Figure 7:
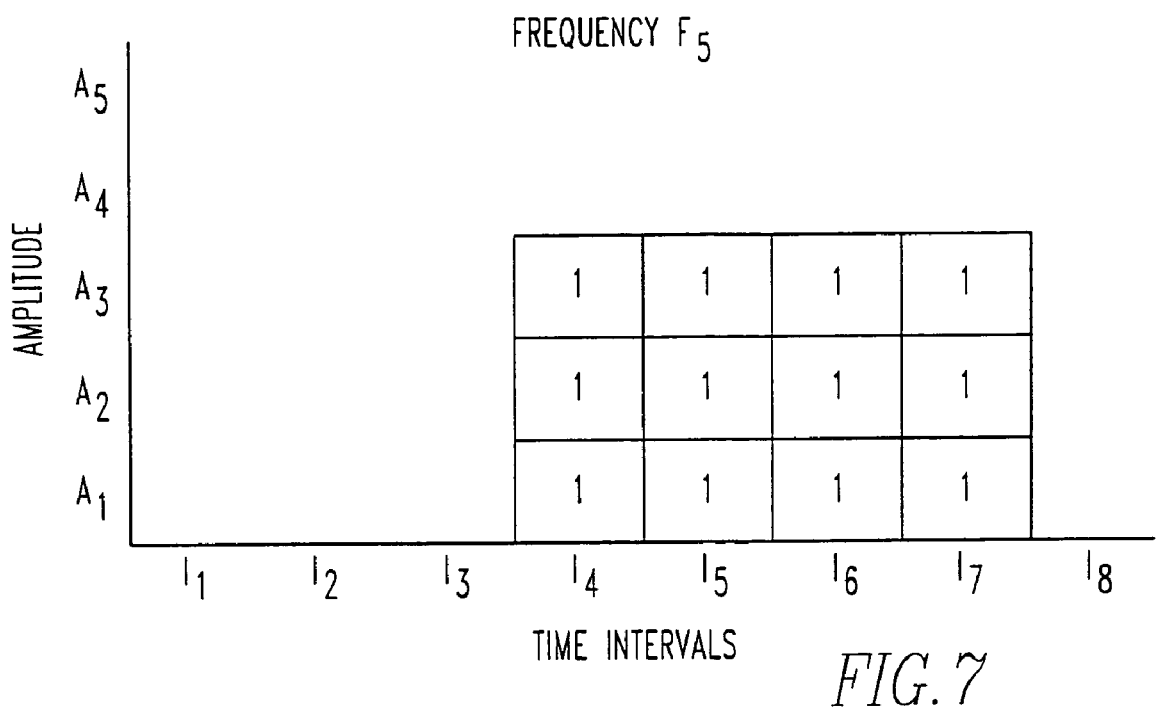
FIG. 7 is a graphical representation of a Dynamic Audio File 60 in which frequency $F_5$ is to be played at amplitudes $A_1$, $A_2$, and $A_3$ during time intervals $I_4$, $I_5$, $I_6$, and $I_7$ on an audio output device.
Figure 8:
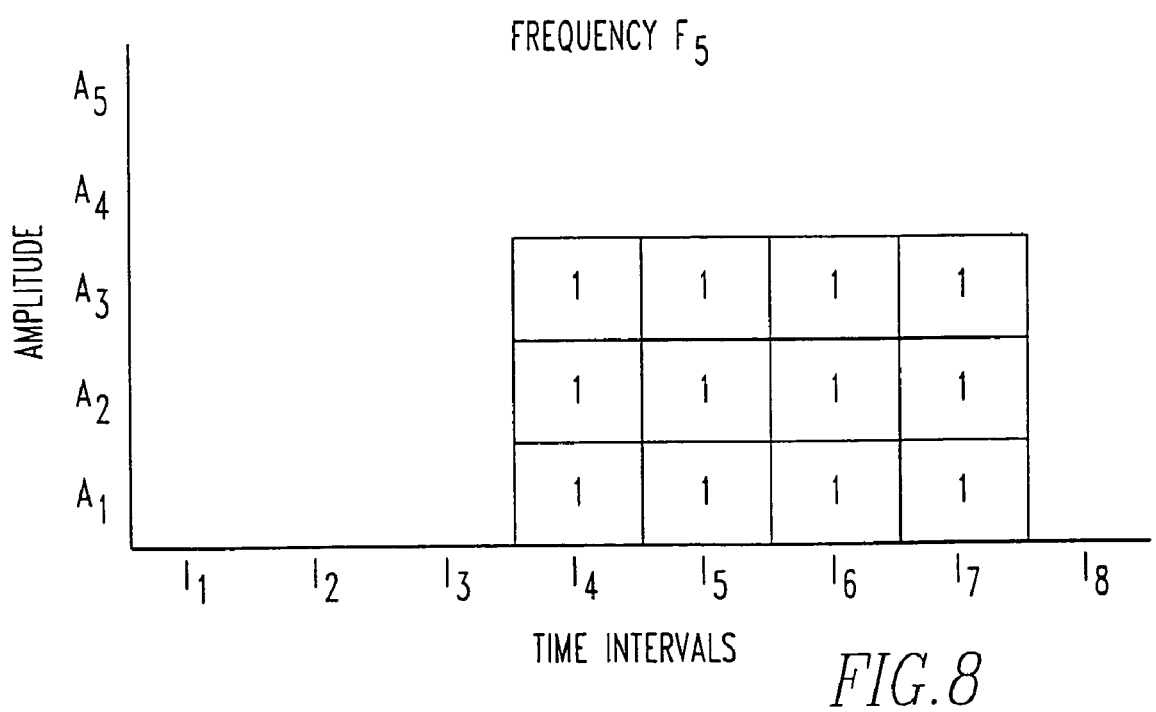
FIG. 8 is a graphical representation of the playback output of a Dynamic Audio File 60 by a Dynamic Audio Player 70 in which frequency $F_5$ is played at amplitudes $A_1$, $A_2$, and $A_3$ during time intervals $I_4$, $I_5$, $I_6$, and $I_7$ on an audio output device.

The Dynamic Audio File 60 is encoded in a format which contains a plurality of frequency/amplitude information by time interval (i.e. AUI, WAV, etc.) and can be easily edited and/or electronically manipulated. As example, and assuming that a Dynamic Audio File 60 is composed of a plurality of discrete sounds identified by their frequencies and their related amplitudes are mathematically expressed as time interval (I), frequency (F), and amplitude (A), where $I_w$ identifies a discrete time interval within a range of intervals identified by subscript "w", and bounded by the first time interval and the last time interval of the audio recording; and $F_x$ identifies a discrete frequency within a range of frequencies identified by subscript "x"; and $A_y$ identifies a specific amplitude, associated with said frequency $F_x$, within a range of amplitudes identified by subscript "y"; and assuming the following information after the equals sign is expressed in binary terms: $F_0$=00000; $F_1$=00001; $F_2$=00010; $F_5$=00101; $A_0$=0000; $A_1$=0001; $A_2$=0010; and $A_3$=0011; where $F_1A_1$, $F_2A_1$, $F_2A_2$, $F_5A_1$, $F_5A_2$, and $F_5A_3$ represent sounds and $F_0A_0$ represents the lack of sound, furthermore, the Dynamic Audio File 60 mathematically represents a consecutive pattern of sound as the algorithm "$I_w=F_xA_y$", and expressed in binary terms as: $I_1$=00001 0001 00010 0001 00010 0010; $I_2$=00001 0001 00010 0001 00010 0010; $I_3$=00001 0001 00010 0001 00010 0010; $I_4$=00001 0001 00010 0001 00010 0010 00101 0001 00101 0010 00101 0011; $I_5$=00001 0001 00010 0001 00010 0010 00101 0001 00101 0010 00101 0011; $I_6$=00001 0001 00101 0001 00101 0010 00101 0011; $I_7$=00001 0001 00101 0001 00101 0010 00101 0011; and $I_8$=00000 0000; which mathematically represents an audio recording whereby a sound $F_1A_1$ is to be played during time intervals $I_1$, $I_2$, $I_3$, $I_4$, $I_5$, $I_6$, and $I_7$; and sounds $F_2A_1$ and $F_2A_2$ are to be played during time intervals $I_1$, $I_2$, $I_3$, $I_4$, and $I_5$; and sounds $F_5A_1$, $F_5A_2$, and $F_5A_3$ are to be played during time intervals $I_4$, $I_5$, $I_6$, and $I_7$; and no sound is to be played in time interval $I_8$ (see FIG. 7). The data string for each time interval $I_w$ is composed of pairs of groups of binary information, the first group in any pair identifies the frequency $F_x$; and the second group in any pair identifies the amplitude $A_y$ of said frequency $F_x$. Further clarifying of this example, the "00001" in the first group of the first pair of binary information in the data string associated with time interval $I_1$ identifies a discrete frequency $F_1$; the "0001" in the second group of the first pair of binary information in the data string associated with time interval $I_1$ identifies the specific amplitude $A_1$ of said frequency $F_1$; and a specific sound $F_1A_1$ was consistently present in the audio recording during the time intervals from $I_1$ to $I_7$, and then the sound $F_1A_1$ is no longer present, or to be played, in time interval $I_8$. Additionally, the "00010" in the first group of the third pair of binary information in the data string associated with time intervals $I_1$ to $I_5$ identifies a discrete frequency $F_2$; the "0010" in the second group of the third pair of binary information in the data string associated with time intervals $I_1$ to $I_5$ identifies the specific amplitude $A_2$ of said frequency $F_2$; therefore a specific sound $F_2A_2$ was consistently present in the audio recording during the time intervals $I_1$ to $I_5$, and then the sound $F_2A_2$ is no longer present, or to be played, in time intervals $I_6$ to $I_8$. Furthermore, the "00101" in the first group of the sixth pair of binary information in the data string associated with time intervals $I_4$ and $I_5$ and the "00101" in the first group of the fourth pair of binary information in the data string associated with time intervals $I_6$ and $I_7$ identifies a discrete frequency $F_5$; the "0011" in the second group of the sixth pair of binary information in the data string associated with time intervals $I_4$ and $I_5$ and the "0011" in the second group of the fourth pair of binary information in the data string associated with time intervals $I_6$ and $I_7$ identifies the specific amplitude $A_3$ of said frequency $F_5$; therefore a specific sound $F_5A_3$ was consistently present in the audio recording during the time intervals $I_4$ and $I_7$, and then the sound $F_5A_3$ is no longer present, or to be played, in time interval $I_8$. The "00000" in the first group of the only pair of binary information in the data string associated with time interval $I_8$ represents the lack of a discrete frequency, or is represented as $F_0$; the "0000" in the second group of the only pair of binary information in the data string associated with time interval $I_8$ represents the lack of a specific amplitude, or is represented as $A_0$, of said frequency $F_0$; therefore $F_0A_0$ indicates that no sound was present in the audio recording during the time interval $I_8$. The Dynamic Audio File 60 records discrete frequency/amplitude information for each, and every, time interval.

Playback of the Dynamic Audio File 60 is accomplished by means of a Dynamic Audio Player 70.

The Frequency/Amplitude Database Compiler 80 is a computer software program executed by the host computer system, which inputs sound information from the Dynamic Audio File 60 into the Frequency/Amplitude Database Compiler 80 and converts the Dynamic Audio File 60 into a Frequency/Amplitude Database 90. As example, the Frequency/Amplitude Database 90 can be composed of a three-dimensional matrix defined by three axes: time interval (I), frequency (F), and amplitude (A). For each time interval $I_w$ and each possible amplitude $A_y$ of each possible frequency $F_x$ exists a unique matrix cell $f_x a_y$. As example, each matrix cell either has sound or lacks sound and can be mathematically expressed in binary terms by a "1" for the presence of sound or by a "0" (or no entry at all) for the lack of sound. The range of the frequency $F_x$ and the range of the amplitude $A_y$, and the range of time intervals $I_w$ (or time intervals per second) can vary from application to application. As example, CD quality sound is generally, but not always, limited to frequencies and amplitudes which the human ear can perceive and each second of sound is divided into 44,100 discrete time intervals. The Frequency/Amplitude Database Compiler 80 accesses the sound information in the Dynamic Audio File 60 and invokes a serial data replication of said sound information to the Frequency/Amplitude Database Compiler 80 (see FIG. 12). Next, the Frequency/Amplitude Database Compiler 80 performs a sort routine with a primary sort by frequency/amplitude $F_x A_y$ and a secondary sort by time interval $I_w$ (first time interval first, last time interval last). Next, the Frequency/Amplitude Database Compiler 80 saves said sorted/collated sound information as a Frequency/Amplitude Database 90. The Frequency/Amplitude Database Compiler 80 can save the Frequency/Amplitude Database 90 on the computer hard disk of said host computer system. The Frequency/Amplitude Database Compiler 80 can electronically relay/transmit the Frequency/Amplitude Database 90 directly to the Dynamic to Static Audio Truncator 100.

Furthermore, the invention utilizes the Dynamic to Static Audio Truncator 100 which is a computer software program to be executed by the host computer system, to mathematically analyze the matrix of the Frequency/Amplitude Database and identify patterns of consecutive sound entries over time for a specific amplitude of a discrete frequency. The Dynamic to Static Audio Truncator 100 creates a Static Audio File 110. The Dynamic to Static Audio Truncator 100 accesses the sorted/collated sound information in the Frequency/Amplitude Database 90 and invokes a serial data dump/replication of said sound information to the Dynamic to Static Audio Truncator 100 (see FIG. 13). Next, the Dynamic to Static Audio Truncator 100 identifies repetition strings of frequencies/amplitudes $F_x A_y$. Next, the Dynamic to Static Audio Truncator 100 converts the first occurrence of sound information in the repetition strings of frequencies/amplitudes $F_x A_y$ to an "on" code (or a binary "1") in the corresponding matrix cell $f_x a_y$ in the corresponding time interval $I_w$. Next, the Dynamic to Static Audio Truncator 100 saves an "off" code (or a binary "0") in the time interval $I_w$ immediately following the last occurrence of sound information in the repetition strings of frequencies/amplitudes $F_x A_y$ in the corresponding matrix cell $f_x a_y$. Next, the Dynamic to Static Audio Truncator 100 erases all occurrences of sound information related to said repetition strings of frequencies/amplitudes $F_x A_y$ between the "on" code and the "off" code. At this point, the sound information has been truncated and the only remaining sound information with respect to said repetition strings of frequencies/amplitudes $F_x A_y$ are "on" codes and "off" codes. Next, the Dynamic to Static Audio Truncator 100 performs a sort routine of said truncated sound information with a primary sort by time interval $I_w$ (first time interval first, last time interval last) and a secondary sort by frequency/amplitude $F_x A_y$. Next, the Dynamic to Static Audio Truncator 100 saves said sorted and truncated sound information as a Static Audio File 110. The Dynamic to Static Audio Truncator 100 can save the Static Audio File 110 on the computer hard disk of said host computer system. The Dynamic to Static Audio Truncator 100 can electronically relay/transmit the Static Audio File 110 directly to the Static Audio Player 120.

Figure 4:
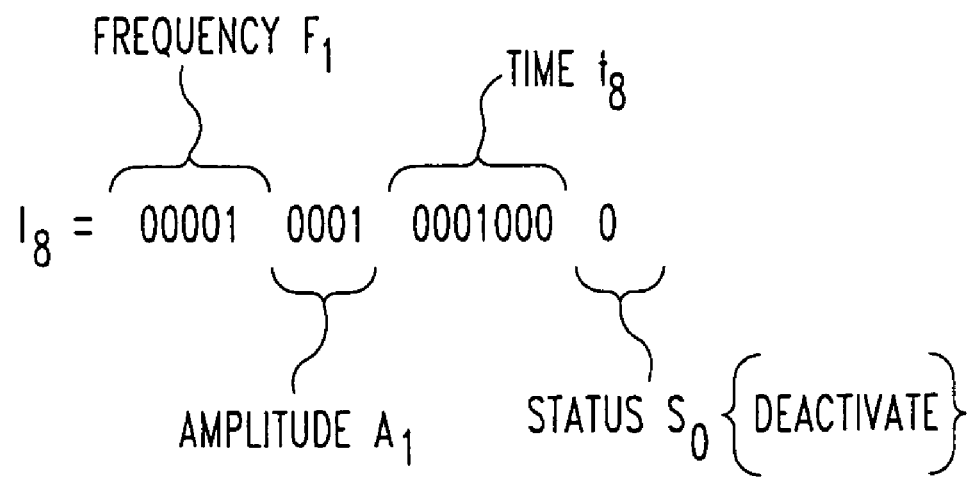
FIG. 4 is a computer algorithm which details one possible configuration of the computer file format for the Static Audio File.
Figure 9:
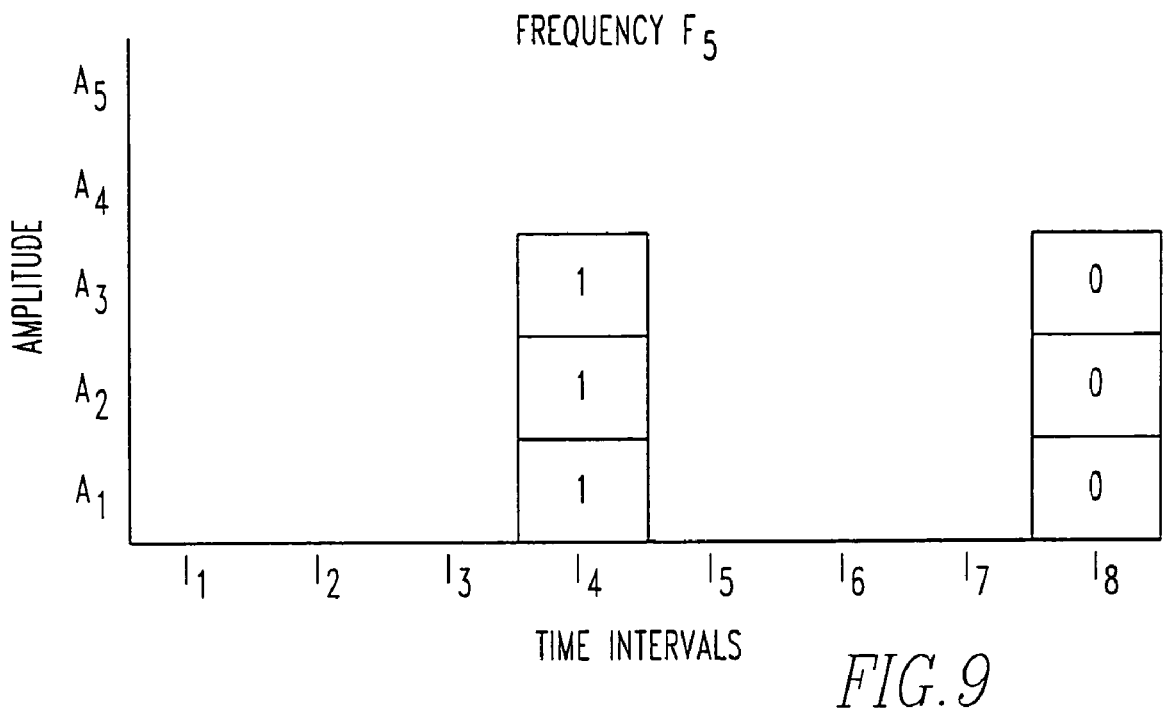
FIG. 9 is a graphical representation of a Static Audio File 110 in which frequency $F_5$ is to be played at amplitudes $A_1$, $A_2$, and $A_3$ during time intervals $I_4$, $I_5$, $I_6$, and $I_7$ on an Audio Output Device 190.

The Static Audio File 110 contains information such as, but not limited to, discrete frequencies and their related amplitudes; the related starting points when each such frequency/amplitude shall commence to be played, and/or commence to be replicated, with respect to time; and the related ending points when each such frequency/amplitude shall cease being played, and/or cease to be replicated, with respect to time. As example, and assuming that discrete sounds identified by their frequency and related amplitude are mathematically expressed as time interval (I), frequency (F), amplitude (A), time (t), and status (s), where $I_w$ identifies a discrete time interval within a range of time intervals identified by the subscript "w", which is bounded by the start time and finish time of the audio recording; and $F_x$ identifies a discrete frequency within a range of frequencies identified by subscript "x"; and $A_y$ identifies a specific amplitude, associated with said frequency $F_x$, within a range of amplitudes identified by subscript "y"; and time $t_z$ identifies a discrete moment in time within a range of time identified by the subscript "z" which is bounded by the start time and finish time of the audio recording, and $t_z$ identifies when the corresponding time interval $I_w$ is to commence to be played, and/or to commence to be replicated; and $s_m$ identifies the status of said frequency/amplitude $F_x A_y$ identified by subscript "m" where a "1" identifies the status of said frequency/amplitude $F_x A_y$ as activated, and a "0" identifies the status of said frequency/amplitude $F_x A_y$ as deactivated; and further assuming the following information after the equals sign is expressed in binary terms: $F_1$=00001; $F_2$=00010; $F_5$=00101; $A_0$=0000; $A_1$=0001; $A_2$=0010; and $A_3$=0011; $t_1$=0000001; $t_2$=0000010; $t_3$=0000011; $t_4$=0000100; $t_5$=0000101; $t_6$=0000110; $t_7$=0000111; $t_8$=0001000; $s_0$=0; and $s_1$=1; the Static Audio File 110 mathematically represents the same consecutive pattern of sound, as used in the example above for the Dynamic Audio File 60, as the algorithm "$I_w$=$F_x A_y t_z s_m$", and expressed in binary terms as: $I_1$=00001 0001 0000001 1 00010 0001 0000001 1 00010 0010 0000001 1; $I_4$=00101 0001 0000100 1 00101 0010 0000100 1 00101 0011 0000100 1; $I_6$=00010 0001 0000110 0 00010 0010 0000110 0; and $I_8$=00001 0001 0001000 0 00101 0001 0001000 0 00101 0010 0001000 0 00101 0011 0001000 0; which mathematically represents an audio recording whereby a sound $F_1 A_1$ is to be played during time intervals $I_1$, $I_2$, $I_3$, $I_4$, $I_5$, $I_6$, and $I_7$; and sounds $F_2 A_1$ and $F_2 A_2$ are to be played during time intervals $I_1$, $I_2$, $I_3$, $I_4$, and $I_5$; and sounds $F_5 A_1$, $F_5 A_2$, and $F_5 A_3$ are to be played during time intervals $I_4$, $I_5$, $I_6$, and $I_7$; and no sound is to be played in time interval $I_8$ (see FIG. 9). The data string for each time interval $I_w$ is composed of sets of four groups of binary information, the first group in any set identifies the frequency $F_x$; the second group in any set identifies the amplitude $A_y$ of said frequency $F_x$; the third group in any set identifies the time $t_z$ corresponding to time interval $I_w$ when said frequency/amplitude $F_x A_y$ is to commence or cease to be played, and/or replicated; and the fourth group in any set identifies the status $s_m$ of the frequency/amplitude $F_x A_y$ and contains either a binary "1" to instruct the Static Audio Player 120 to commence to play, and/or commence to replicate, said frequency/amplitude $F_x A_y$, or a binary "0" to instruct the Static Audio Player 120 to cease to playing, and/or cease replicating, said frequency/amplitude $F_x A_y$. In the example above, and as further clarification, the "00001" in the first group of the first set of binary information in the data string associated with time interval $I_1$ identifies a discrete frequency #$F_1$; the "0001" in the second group of the first set of binary information in the data string associated with time interval $I_1$ identifies the specific amplitude $A_1$ of said frequency $F_1$; the "0000001" in the third group of the first set of binary information in the data string associated with time interval $I_1$ identifies the time $t_1$ corresponding to time interval $I_1$ when said frequency/amplitude $F_1A_1$ is to commence to be played, and/or to commence to be replicated; and the "1" in the fourth group of the first set of binary information in the data string associated with time interval $I_1$ identifies the status $s_1$ of said frequency/amplitude $F_1A_1$ and provides the Static Audio Player 120 the instruction to commence to play, and/or commence to replicate, said frequency/amplitude $F_1A_1$ at time $t_1$ (see FIG. 3); and the "00001" in the first group of the first set of binary information in the data string associated with time interval $I_8$ identifies a discrete frequency $F_1$; the "0001" in the second group of the first set of binary information in the data string associated with time interval $I_8$ identifies the specific amplitude $A_1$ of said frequency $F_1$; the "0001000" in the third group of the first set of binary information in the data string associated with time interval $I_8$ identifies the time $t_8$ when said frequency/amplitude $F_1A_1$ is to cease to be played, and/or to cease to be replicated; and the "0" in the fourth group of the first set of binary information in the data string associated with time interval $I_8$ identifies the status $s_0$ of said frequency/amplitude $F_1A_1$ and provides the Static Audio Player 120 the instruction to cease to play, and/or cease to replicate, said frequency/amplitude $F_1A_1$ at time interval $I_8$ (see FIG. 4). Additionally, the "00010" in the first group of the third set of binary information in the data string associated with time interval $I_1$ identifies a discrete frequency $F_2$; the "0010" in the second group of the third set of binary information in the data string associated with time interval $I_1$ identifies the specific amplitude $A_2$ of said frequency $F_2$; the "0000001" in the third group of the third set of binary information in the data string associated with time interval $I_1$ identifies the time $t_1$ corresponding to time interval $I_1$ when said frequency/amplitude $F_2A_2$ is to commence to be played, and/or to commence to be replicated; and the "1" in the fourth group of the third set of binary information in the data string associated with time interval $I_1$ identifies the status $s_1$ of said frequency/amplitude $F_2A_2$ and provides the Static Audio Player 120 the instruction to commence to play, and/or commence to replicate, said frequency/amplitude $F_2A_2$ at time $t_1$; and the "00010" in the first group of the second set of binary information in the data string associated with time interval $I_6$ identifies a discrete frequency $F_2$; the "0010" in the second group of the second set of binary information in the data string associated with time interval $I_6$ identifies the specific amplitude $A_2$ of said frequency $F_2$; the "0000110" in the third group of the second set of binary information in the data string associated with time interval $I_6$ identifies the time $t_6$ when said frequency/amplitude $F_2A_2$ is to cease to be played, and/or to cease to be replicated; and the "0" in the fourth group of the second set of binary information in the data string associated with time interval $I_6$ identifies the status $s_0$ of said frequency/amplitude $F_2A_2$ and provides the Static Audio Player 120 the instruction to cease to play, and/or cease to replicate, said frequency/amplitude $F_2A_2$ at time interval $I_6$, therefore a specific sound $F_2A_2$ was consistently present in the audio recording during the time intervals $I_1$ to $I_5$, and then the sound $F_2A_2$ is no longer present, or to be played, in time intervals $I_6$ to $I_8$. Furthermore, the "00101" in the first group of the sixth pair of binary information in the data string associated with time interval $I_4$ identifies a discrete frequency $F_5$; the "0011" in the second group of the sixth pair of binary information in the data string associated with time interval $I_4$ identifies the specific amplitude $A_3$ of said frequency $F_5$; the "0000100" in the third group of the third set of binary information in the data string associated with time interval $I_4$ identifies the time $t_4$ corresponding to time interval $I_4$ when said frequency/amplitude $F_5A_3$ is to commence to be played, and/or to commence to be replicated; and the "1" in the fourth group of the third set of binary information in the data string associated with time interval $I_4$ identifies the status $s_1$ of said frequency/amplitude $F_5A_3$ and provides the Static Audio Player 120 the instruction to commence to play, and/or commence to replicate, said frequency/amplitude $F_5A_3$ at time $t_4$; and the "00101" in the first group of the fourth set of binary information in the data string associated with time interval $I_8$ identifies a discrete frequency $F_5$; the "0011" in the second group of the fourth set of binary information in the data string associated with time interval $I_8$ identifies the specific amplitude $A_3$ of said frequency $F_5$; the "0001000" in the third group of the fourth set of binary information in the data string associated with time interval $I_8$ identifies the time $t_8$ when said frequency/amplitude $F_5A_3$ is to cease to be played, and/or to cease to be replicated; and the "0" in the fourth group of the fourth set of binary information in the data string associated with time interval $I_8$ identifies the status $s_0$ of said frequency/amplitude $F_5A_3$ and provides the Static Audio Player 120 the instruction to cease to play, and/or cease to replicate, said frequency/amplitude $F_5A_3$ at time interval $I_8$, therefore a specific sound $F_5A_3$ was consistently present in the audio recording during the time intervals $I_4$ and $I_7$, and then the sound $F_5A_3$ is no longer present, or to be played, in time interval $I_8$. The Static Audio File 110 is saved in the hard disk of the host computer system containing the Static Audio Player 120 and the Static Audio File 150 is saved in the hard disk of the computer system containing the Static Audio Player 130.

The Static Audio Player 120 is a computer software program saved in the hard disk of the host computer system. When the Static Audio Player 120 is activated, the central processing unit of the host computer system transmits a copy of the program to random access memory within the host computer system for execution of the various functions of the Static Audio Player 120, as is convention with most computer software programs. The Static Audio Player 120 accesses the Static Audio File 110 and replicates and saves sound information from the Static Audio File 110 into a time interval buffer memory within the Static Audio Player 120. The Static Audio Player 120 then transmits said sound information from said time interval buffer memory to the frequency/amplitude memory registers within the Static Audio Player 120, one time interval at a time. As example, the Static Audio Player 120 accesses the Static Audio File 110 and invokes a serial data replication of the sound information related to the first time interval into a frequency/amplitude matrix within a time interval buffer memory within the Static Audio Player 120. The Static Audio Player 120 then invokes a parallel data dump of said sound information related to the first time interval from said time interval buffer memory to the frequency/amplitude memory registers within the Static Audio Player 120. The Static Audio Player 120 then invokes a parallel data dump (i.e. a data dump is the process whereby data in a buffer memory is electronically transmitted to another mechanism or memory then is electronically erased from said buffer memory) of said sound information related to the first time interval from said time interval buffer memory to said frequency/amplitude memory registers. As the Static Audio Player 120 invokes a parallel data dump of said sound information related to the first time interval from said time interval buffer memory to said frequency/amplitude memory registers, the Static Audio Player 120 accesses the Static Audio File 110 and invokes a serial data replication of the sound information related to the second time interval into said frequency/amplitude memory matrix within said time interval buffer memory within the Static Audio Player 120. As the Static Audio Player 120 invokes a parallel data dump of the sound information related to the first time interval from said frequency/amplitude memory registers to a sound card buffer memory within the Static Audio Player 120 (as discussed herein below) the Static Audio Player 120 invokes a parallel data dump of said sound information related to the second time interval from said time interval buffer memory to said frequency/amplitude memory registers. The sound information in the third time interval, forth time interval, fifth time interval, etc. will continue in the above manner until the end of the Static Audio File 110.

As mentioned above, the Static Audio Player 120 saves sound information from the Static Audio File 110 into a matrix of frequency/amplitude memory registers $f_x a_y$ within the Static Audio Player 120. Each frequency/amplitude $F_x A_y$ is pre-assigned to a specific frequency/amplitude memory register $f_x a_y$. The Static Audio Player 120 activates, or deactivates, the memory register $f_x a_y$ of a discrete frequency/amplitude $F_x A_y$ upon instruction from the Static Audio File 110. As example, a binary "1" activates, or is saved into, a frequency/amplitude memory register $f_x a_y$ and a binary "0" deactivates, erases, or is saved into, said frequency/amplitude memory register $f_x a_y$. It is important to note that if any of the frequency/amplitude memory registers do not receive a data dump for any particular time interval $I_w$, those such frequency/amplitude memory registers $f_x a_y$ will not be modified for any such time interval $I_w$. Furthermore, once a binary "1" has been saved in a frequency/amplitude memory register $f_x a_y$ corresponding to a frequency/amplitude $F_x A_y$, the Static Audio Player 120 does not need to receive any further sound information from the Static Audio File 110 to enable the Static Audio Player 120 to continue to play, and/or replicate, said frequency/amplitude $F_x A_y$ on an Audio Output Device 190. Conversely, once a binary "0" has been saved in said frequency/amplitude memory register $f_x a_y$ corresponding to a frequency/amplitude $F_x A_y$, or said frequency/amplitude memory register $f_x a_y$ has been erased and/or deactivated, the Static Audio Player 120 does not need to receive any further sound information from the Static Audio File 110 to enable the Static Audio Player 120 to continue to cease play of, and/or cease replication of, said frequency/amplitude $F_x A_y$ on an Audio Output Device 190. Using the previous example where the Static Audio File 110 mathematically represents an audio recording as the algorithm "$I_w = F_x A_y t_z s_m$", and expressed in binary terms as: $I_1$=00001 0001 0000001 1 00010 0001 0000001 1 00010 0010 0000001 1; $I_4$=00101 0001 0000100 1 00101 0010 0000100 1 00101 0011 0000100 1; $I_6$=00010 0001 0000110 0 00010 0010 0000110 0; and $I_8$=00001 0001 0001000 0 00101 0001 0001000 0 00101 0010 0001000 0 00101 0011 0001000 0; which mathematically represents an audio recording whereby a sound $F_1 A_1$ is to be played during time intervals $I_1, I_2, I_3, I_4, I_5, I_6$, and $I_7$; and sounds $F_2 A_1$ and $F_2 A_2$ are to be played during time intervals $I_1, I_2, I_3, I_4$, and $I_5$; and sounds $F_5 A_1, F_5 A_2$, and $F_5 A_3$ are to be played during time intervals $I_4, I_5, I_6$, and $I_7$; and no sound is to be played in time interval $I_8$ (see FIG. 9). As further clarification, only said sounds $F_1 A_1$, $F_2 A_2$, and $F_5 A_3$ are discussed below, detailing the process the Static Audio Player 120 utilizes to replicate sound information from the Static Audio File 110 to the frequency/amplitude memory registers within the Static Audio Player 120. The "00001" in the first group of the first set of binary information in the data string associated with time interval $I_1$ identifies a discrete frequency $F_1$; the "0001" in the second group of the first set of binary information in the data string associated with time interval $I_1$ identifies the specific amplitude $A_1$ of said frequency $F_1$; the "0000001" in the third group of the first set of binary information in the data string associated with time interval $I_1$ identifies the time $t_1$ when said frequency/amplitude $F_1 A_1$ is to commence to be played and/or replicated; and the "1" in the fourth group of the first set of binary information in the data string associated with time interval $I_1$ identifies the status $s_1$ of said frequency/amplitude $F_1 A_1$ and upon commencing the sequential serial transmission of sound information by time interval from the Static Audio File 110, the Static Audio Player 120 replicates and saves sound information related to time interval $I_1$ from the Static Audio File 110 into the time interval buffer memory, including said "1" in said fourth group of said first set of binary information in said data string associated with time interval $I_1$, and then the Static Audio Player 120 invokes a parallel data dump of all sound information related to time interval $I_1$ from the time interval buffer memory to the frequency/amplitude memory registers, including said "1" in said fourth group of said first set of binary information in said data string associated with time interval $I_1$ which is saved in the $f_1 a_1$ memory register within the Static Audio Player 120 at time $t_1$. The "00001" in the first group of the first set of binary information in the data string associated with time interval $I_8$ identifies a discrete frequency $F_1$; the "0001" in the second group of the first set of binary information in the data string associated with time interval $I_8$ identifies the specific amplitude $A_1$ of said frequency $F_1$; the "0001000" in the third group of the first set of binary information in the data string associated with time interval $I_8$ identifies the time $t_8$ when said frequency/amplitude $F_1 A_1$ is to cease to be played, and/or to cease to be replicated; and the "0" in the fourth group of the first set of binary information in the data string associated with time interval $I_8$ identifies the status $s_0$ of said frequency/amplitude $F_1 A_1$ and when the sequential serial transmission of sound information by time interval reaches the point when sound information related to time interval $I_8$ is to be accessed from the Static Audio File 110, the Static Audio Player 120 replicates and saves sound information related to time interval $I_8$ from the Static Audio File 110 into the time interval buffer memory, including said "0" in said fourth group of said first set of binary information in said data string associated with time interval $I_8$, and then the Static Audio Player 120 invokes a parallel data dump of all sound information related to time interval $I_8$ from the time interval buffer memory to the frequency/amplitude memory registers, including said "0" in said fourth group of said first set of binary information in said data string associated with time interval $I_8$ which is saved in the $f_1 a_1$ memory register within the Static Audio Player 120 at time $t_8$. Additionally, the "00010" in the first group of the third set of binary information in the data string associated with time interval $I_1$ identifies a discrete frequency $F_2$; the "0010" in the second group of the third set of binary information in the data string associated with time interval $I_1$ identifies the specific amplitude $A_2$ of said frequency $F_2$; the "0000001" in the third group of the third set of binary information in the data string associated with time interval $I_1$ identifies the time $t_1$ corresponding to time interval $I_1$ when said frequency/amplitude $F_2 A_2$ is to commence to be played, and/or to commence to be replicated; and the "1" in the fourth group of the third set of binary information in the data string associated with time interval $I_1$ identifies the status $s_1$ of said frequency/amplitude $F_2 A_2$ and upon commencing the sequential serial transmission of sound information by time interval from the Static Audio File 110, the Static Audio Player 120 replicates and saves sound information related to time interval $I_1$ from the Static Audio File 110 into the time interval buffer memory, including said "1" in said fourth group of said third set of binary information in said data string associated with time interval $I_1$, and then the Static Audio Player 120 invokes a parallel data dump of all sound information related to time interval $I_1$ from the time interval buffer memory to the frequency/amplitude memory registers, including said "1" in said fourth group of said third set of binary information in said data string associated with time interval $I_1$ which is saved in the $f_2a_2$ memory register within the Static Audio Player 120 at time $t_1$. The "00010" in the first group of the second set of binary information in the data string associated with time interval $I_6$ identifies a discrete frequency $F_2$; the "0010" in the second group of the second set of binary information in the data string associated with time interval $I_6$ identifies the specific amplitude $A_2$ of said frequency $F_2$; the "0000110" in the third group of the second set of binary information in the data string associated with time interval $I_6$ identifies the time $t_6$ when said frequency/amplitude $F_2A_2$ is to cease to be played, and/or to cease to be replicated; and the "0" in the fourth group of the second set of binary information in the data string associated with time interval $I_6$ identifies the status $s_0$ of said frequency/amplitude $F_2A_2$ and when the sequential serial transmission of sound information by time interval reaches the point when sound information related to time interval $I_6$ is to be accessed from the Static Audio File 110, the Static Audio Player 120 replicates and saves sound information related to time interval $I_6$ from the Static Audio File 110 into the time interval buffer memory, including said "0" in said fourth group of said second set of binary information in said data string associated with time interval $I_6$, and then the Static Audio Player 120 invokes a parallel data dump of all sound information related to time interval $I_6$ from the time interval buffer memory to the frequency/amplitude memory registers, including said "0" in said fourth group of said second set of binary information in said data string associated with time interval $I_6$ which is saved in the $f_2a_2$ memory register within the Static Audio Player 120 at time $t_6$. Furthermore, the "00101" in the first group of the sixth pair of binary information in the data string associated with time interval $I_4$ identifies a discrete frequency $F_5$; the "0011" in the second group of the sixth pair of binary information in the data string associated with time interval $I_4$ identifies the specific amplitude $A_3$ of said frequency $F_5$; the "0000100" in the third group of the third set of binary information in the data string associated with time interval $I_4$ identifies the time $t_4$ corresponding to time interval $I_4$ when said frequency/amplitude $F_5A_3$ is to commence to be played, and/or to commence to be replicated; and the "1" in the fourth group of the third set of binary information in the data string associated with time interval $I_4$ identifies the status $s_1$ of said frequency/amplitude $F_5A_3$ and when the sequential serial transmission of sound information by time interval reaches the point when sound information related to time interval $I_4$ is to be accessed from the Static Audio File 110, the Static Audio Player 120 replicates and saves sound information related to time interval $I_4$ from the Static Audio File 110 into the time interval buffer memory, including said "1" in said fourth group of said third set of binary information in said data string associated with time interval $I_4$, and then the Static Audio Player 120 invokes a parallel data dump of all sound information related to time interval $I_4$ from the time interval buffer memory to the frequency/amplitude memory registers, including said "1" in said fourth group of said third set of binary information in said data string associated with time interval $I_4$ which is saved in the $f_2a_2$ memory register within the Static Audio Player 120 at time $t_4$. The "00101" in the first group of the fourth set of binary information in the data string associated with time interval $I_8$ identifies a discrete frequency $F_5$; the "0011" in the second group of the fourth set of binary information in the data string associated with time interval $I_8$ identifies the specific amplitude $A_3$ of said frequency $F_5$; the "0001000" in the third group of the fourth set of binary information in the data string associated with time interval $I_8$ identifies the time $t_8$ when said frequency/amplitude $F_5A_3$ is to cease to be played, and/or to cease to be replicated; and the "0" in the fourth group of the fourth set of binary information in the data string associated with time interval $I_8$ identifies the status $s_0$ of said frequency/amplitude $F_5A_3$ and when the sequential serial transmission of sound information by time interval reaches the point when sound information related to time interval $I_8$ is to be accessed from the Static Audio File 110, the Static Audio Player 120 replicates and saves sound information related to time interval $I_8$ from the Static Audio File 110 into the time interval buffer memory, including said "0" in said fourth group of said fourth set of binary information in said data string associated with time interval $I_8$, and then the Static Audio Player 120 invokes a parallel data dump of all sound information related to time interval $I_8$ from the time interval buffer memory to the frequency/amplitude memory registers, including said "0" in said fourth group of said fourth set of binary information in said data string associated with time interval $I_8$ which is saved in the $f_5a_3$ memory register within the Static Audio Player 120 at time $I_8$.

Furthermore, the invention utilizes the Static Audio Player 120 to playback, and/or replicate, sound information saved from the Static Audio File 110 into the frequency/amplitude memory registers in the Static Audio Player 120. The Static Audio Player 120 sequentially replicates, one time interval at a time, the sound information contained in all of the frequency/amplitude memory registers into a sound card buffer memory within the Static Audio Player 120. Next, the Static Audio Player 120 transmits said sound information to the sound card of the host computer. Upon receipt of the sound information, said sound card transmits said sound information to the Audio Output Device 190 for playback. As example, the Static Audio Player 120 invokes a parallel data replication of the sound information related to the first time interval from the frequency/amplitude memory registers to a sound card buffer memory within the Static Audio Player 120. Next, the Static Audio Player 120 invokes a parallel data dump of the sound information related to the first time interval from the sound card buffer memory, sequentially by time interval and at the intended playback rate (i.e. 44,100 time intervals per second for CD quality sound), to said sound card through an electronic connecting bus, and said sound card transmits/relays, in either digital form or analog form, said sound information related to said first time interval to the Audio Output Device 190 for playback. While the Static Audio Player 120 invokes a parallel data replication of the sound information related to said first time interval from the frequency/amplitude memory registers to said sound card buffer memory, the Static Audio Player 120 also invokes a parallel data dump of the sound information related to the second time interval from the time interval buffer memory (as mentioned hereinabove) to said frequency/amplitude memory registers. While the Static Audio Player 120 invokes a parallel data dump of the sound information related to said first time interval from said sound card buffer memory to said sound card, the Static Audio Player 120 also invokes a parallel data replication of the sound information related to the second time interval from said frequency/amplitude memory registers to said sound card buffer memory. While said sound card transmits/relays the sound information related to said first time interval to the Audio Output Device 190 for playback, the Static Audio Player 120 invokes a parallel data dump of the sound information related to the second time interval from the sound card buffer memory to said sound card through said electronic connecting bus, and said sound card transmits/relays, in either digital form or analog form, said sound information related to said second time interval to the Audio Output Device 190 for playback. The sound information in the third time interval, forth time interval, fifth time interval, etc. will continue in the above manner until the end of the Static Audio File 110.

Additionally, the invention utilizes the Static Audio Player 120 to playback, and/or replicate, sound information saved from the Static Audio File 150 into the frequency/amplitude memory registers in the Static Audio Player 120 in a similar manner as mentioned above for the sound information received by the Static Audio Player 120 by the Static Audio File 110. The Static Audio Player 120 may receive sound information from the Static Audio File 150 via the Electronic Connection 140 in a download fashion or in a broadcast fashion. As example, in a download transmission, a Static Audio Player 130 of a sending computer system creates an electronic copy of a Static Audio File 150 and transmits said Static Audio File 150 serially by means of a conventional modem electronically connecting said sending computer system to the Electronic Connection 140 and received by a receiving computer system by means of a conventional modem electronically connecting the receiving computer system to the Electronic Connection 140 and the sound information of the Static Audio File 150 is electronically stored in the hard disk of the receiving computer system as a Static Audio File 110 (i.e. U.S. Pat. No. 5,191,573). Also as example, in a broadcast transmission, a Static Audio Player 130 of a sending computer system creates an electronic copy of a Static Audio File 150 and transmits said Static Audio File 150 serially, and at the playback rate of the recording (i.e. 44,100 time intervals per second for CD quality sound), by means of a conventional modem electronically connecting the sending computer system to the Electronic Connection 140 and received by a Static Audio Player 120 of a receiving computer system by means of a conventional modem electronically connecting said receiving computer system to the Electronic Connection 140 and the sound information of said Static Audio File 150 is subsequently transmitted by the receiving Static Audio Player 120 to the sound card of the receiving computer system for playback on the Audio Output Device 190.

Figure 10:
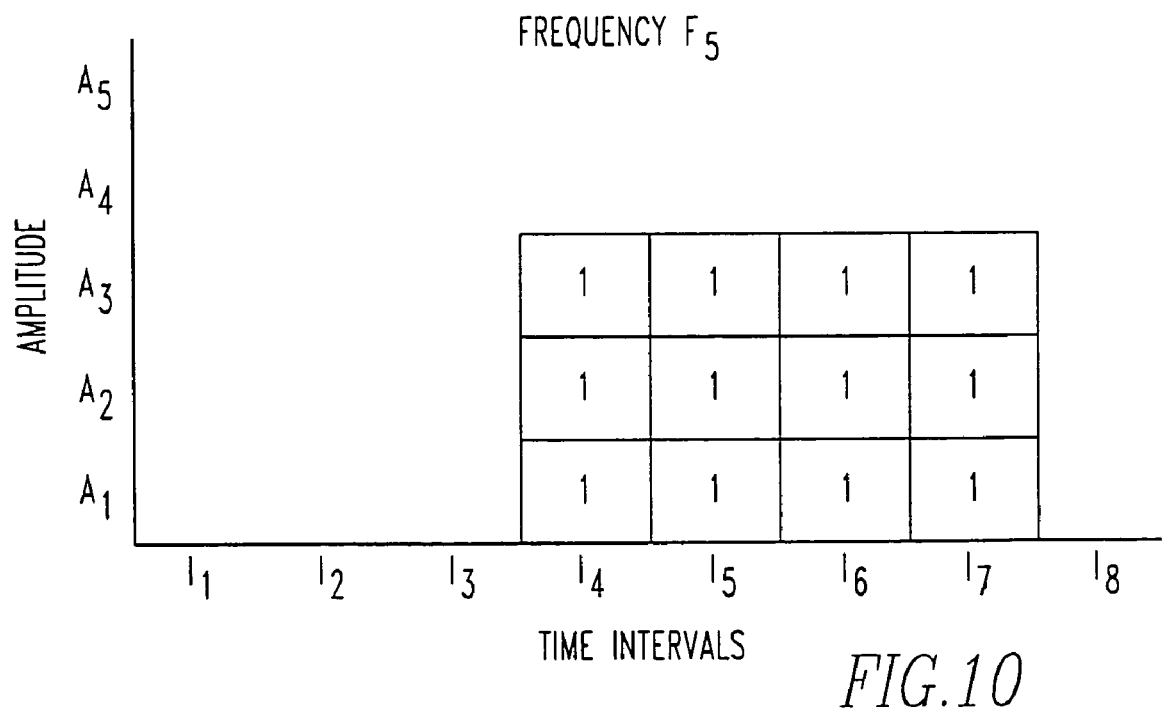
FIG. 10 is a graphical representation of the playback output of a Static Audio File 110 by a Static Audio Player 120 in which frequency $F_5$ is played at amplitudes $A_1$, $A_2$, and $A_3$ during time intervals $I_4$, $I_5$, $I_6$, and $I_7$ on an Audio Output Device 190.

The Static Audio Player 120 will playback, and/or replicate, discrete frequency/amplitude information corresponding to each memory register which is active, or contains a binary "1". Conversely, the Static Audio Player 120 will cease playback, and/or replication, of any frequency/amplitude corresponding to any memory register which the Static Audio File 110 and/or 150 has instructed the Static Audio File 110 to deactivate, erase, or save a binary "0" within. Again, using the previous example where the Static Audio File 110 mathematically represents an audio recording as the algorithm "$I_w = F_x A_y t_z s_m$", and expressed in binary terms as: $I_1$=00001 0001 0000001 1 00010 0001 0000001 1 00010 0010 0000001 1; $I_4$=00101 0001 0000100 1 00101 0010 0000100 1 00101 0011 0000100 1; $I_6$=00010 0001 0000110 0 00010 0010 0000110 0; and $I_8$=00001 0001 0001000 0 00101 0001 0001000 0 00101 0010 0001000 0 00101 0011 0001000 0; which mathematically represents an audio recording whereby a sound $F_1 A_1$ is to be played during time intervals $I_1$, $I_2$, $I_3$, $I_4$, $I_5$, $I_6$, and $I_7$; and sounds $F_2 A_1$ and $F_2 A_2$ are to be played during time intervals $I_1$, $I_2$, $I_3$, $I_4$, and $I_5$; and sounds $F_5 A_1$, $F_5 A_2$, and $F_5 A_3$ are to be played during time intervals $I_4$, $I_5$, $I_6$, and $I_7$; and no sound is to be played in time interval $I_8$ (see FIG. 10). As further clarification, only said sounds $F_1 A_1$, $F_2 A_2$, and $F_5 A_3$ are discussed below, detailing the process the Static Audio Player 120 utilizes to play sound information from the frequency/amplitude memory registers within the Static Audio File 110 to the Audio Output Device 190. The "00001" in the first group of the first set of binary information in the data string associated with time interval $I_1$ identifies a discrete frequency $F_1$; the "0001" in the second group of the first set of binary information in the data string associated with time interval $I_1$ identifies the specific amplitude $A_1$ of said frequency $F_1$; the "0000001" in the third group of the first set of binary information in the data string associated with time interval $I_1$ identifies the time $t_1$ when said frequency/amplitude $F_1 A_1$ is to be played and/or replicated; and the "1" in the fourth group of the first set of binary information in the data string associated with time interval $I_1$ identifies the status $s_1$ of said frequency/amplitude $F_1 A_1$ and enables the Static Audio Player 120 to activate, or save a binary "1" in, the $f_1 a_1$ memory register within the Static Audio Player 120, and upon commencing the sequential parallel data replication of sound information by time interval from the frequency/amplitude memory registers the Static Audio Player 120 invokes a sequential parallel data replication of sound information related to time interval $I_1$ from the frequency/amplitude memory registers to the sound card buffer memory, including said "1" in said fourth group of said first set of binary information in said data string associated with time interval $I_1$ and then the Static Audio Player 120 invokes a sequential parallel data dump of sound information related to time interval $I_1$ from the sound card buffer memory to the sound card of the host computer system, including said "1" in said fourth group of said first set of binary information in said data string associated with time interval $I_1$, and the sound card then relays/transmits sound information related to time interval $I_1$ to the Audio Output Device 190, including frequency/amplitude $F_1 A_1$ thereby enabling playback, and/or replication, of frequency/amplitude $F_1 A_1$ at time $t_1$. The "00001" in the first group of the first set of binary information in the data string associated with time interval $I_8$ identifies a discrete frequency $F_1$; the "0001" in the second group of the first set of binary information in the data string associated with time interval $I_8$ identifies the specific amplitude $A_1$ of said frequency $F_1$; the "0001000" in the third group of the first set of binary information in the data string associated with time interval $I_8$ identifies the time $t_8$ when said frequency/amplitude $F_1 A_1$ is to cease to be played, and/or to cease to be replicated; and the "0" in the fourth group of the first set of binary information in the data string associated with time interval $I_8$ identifies the status $s_0$ of said frequency/amplitude $F_1 A_1$ and enables the Static Audio Player 120 to deactivate, erase, or save a binary "0" in, the $f_1 a_1$ memory register within the Static Audio Player 120, and when the sequential parallel data replication of sound information by time interval from the frequency/amplitude memory registers reaches the point when sound information related to time interval $I_8$ is to be replicated from the frequency/amplitude memory registers, the Static Audio Player 120 invokes a sequential parallel data replication of sound information related to time interval $I_8$ from the frequency/amplitude memory registers to the sound card buffer memory, including said "0" in said fourth group of said first set of binary information in said data string associated with time interval $I_8$. Next, the Static Audio Player 120 invokes a sequential parallel data dump of sound information related to time interval $I_8$ from the sound card buffer memory to the sound card of the host computer system, including said "0" in said fourth group of said first set of binary information in said data string associated with time interval $I_8$, and the sound card then relays/transmits sound information related to time interval $I_8$ to the Audio Output Device 190, however, since said "0" in said fourth group of said first set of binary information in said data string associated with time interval $I_8$ is a signal to terminate playback of frequency/amplitude $F_1A_1$, the sound card terminates the relay/transmit of frequency/amplitude $F_1A_1$ to the Audio Output Device 190 thereby terminating playback, and/or replication, of frequency/amplitude $F_1A_1$ at time $t_8$. Additionally, the "00010" in the first group of the third set of binary information in the data string associated with time interval $I_1$ identifies a discrete frequency $F_2$; the "0010" in the second group of the third set of binary information in the data string associated with time interval $I_1$ identifies the specific amplitude $A_2$ of said frequency $F_2$; the "0000001" in the third group of the third set of binary information in the data string associated with time interval $I_1$ identifies the time $t_1$ corresponding to time interval $I_1$ when said frequency/amplitude $F_2A_2$ is to commence to be played, and/or to commence to be replicated; and the "1" in the fourth group of the third set of binary information in the data string associated with time interval $I_1$ identifies the status $s_1$ of said frequency/amplitude $F_2A_2$ and enables the Static Audio Player 120 the activate, or save a binary "1" in, the $f_2a_2$ memory register within the Static Audio Player 120, and upon commencing the sequential parallel data replication of sound information by time interval from the frequency/amplitude memory registers the Static Audio Player 120 invokes a sequential parallel data replication of sound information related to time interval $I_1$ from the frequency/amplitude memory registers to the sound card buffer memory, including said "1" in said fourth group of said third set of binary information in said data string associated with time interval $I_1$. Next, the Static Audio Player 120 invokes a sequential parallel data dump of all sound information related to time interval $I_1$ from the sound card buffer memory to the sound card of the host computer system, including said "1" in said fourth group of said third set of binary information in said data string associated with time interval $I_1$, and the sound card then relays/transmits sound information related to time interval $I_1$ to the Audio Output Device 190, including frequency/amplitude $F_2A_2$ thereby enabling playback, and/or replication, of frequency/amplitude $F_2A_2$ at time $t_1$. The "00010" in the first group of the second set of binary information in the data string associated with time interval $I_6$ identifies a discrete frequency $F_2$; the "0010" in the second group of the second set of binary information in the data string associated with time interval $I_6$ identifies the specific amplitude $A_2$ of said frequency $F_2$; the "0000110" in the third group of the second set of binary information in the data string associated with time interval $I_6$ identifies the time $t_6$ when said frequency/amplitude $F_2A_2$ is to cease to be played, and/or to cease to be replicated; and the "0" in the fourth group of the second set of binary information in the data string associated with time interval $I_6$ identifies the status $s_0$ of said frequency/amplitude $F_2A_2$ and enables the Static Audio Player 120 to deactivate, erase, or save a binary "0" in, the $f_2a_2$ memory register within the Static Audio Player 120, and when the sequential parallel data replication of sound information by time interval from the frequency/amplitude memory registers reaches the point when sound information related to time interval $I_6$ is to be replicated from the frequency/amplitude memory registers, the Static Audio Player 120 invokes a sequential parallel data replication of sound information related to time interval $I_6$ from the frequency/amplitude memory registers to the sound card buffer memory, including said "0" in said fourth group of said second set of binary information in said data string associated with time interval $I_6$. Next, the Static Audio Player 120 invokes a sequential parallel data dump of all sound information related to time interval $I_6$ from the sound card buffer memory to the sound card of the host computer system, including said "0" in said fourth group of said second set of binary information in said data string associated with time interval $I_6$, and the sound card then relays/transmits sound information related to time interval $I_6$ to the Audio Output Device 190, however, since said "0" in said fourth group of said second set of binary information in said data string associated with time interval $I_6$ is a signal to terminate playback of frequency/amplitude $F_2A_2$, the sound card terminates the relay/transmit of frequency/amplitude $F_2A_2$ to the Audio Output Device 190 thereby terminating playback, and/or replication, of frequency/amplitude $F_2A_2$ at time $t_8$. Furthermore, the "00101" in the first group of the sixth pair of binary information in the data string associated with time interval $I_4$ identifies a discrete frequency $F_5$; the "0011" in the second group of the sixth pair of binary information in the data string associated with time interval $I_4$ identifies the specific amplitude $A_3$ of said frequency $F_5$; the "0000100" in the third group of the third set of binary information in the data string associated with time interval $I_4$ identifies the time $t_4$ corresponding to time interval $I_4$ when said frequency/amplitude $F_5A_3$ is to commence to be played, and/or to commence to be replicated; and the "1" in the fourth group of the third set of binary information in the data string associated with time interval $I_4$ identifies the status $s_1$ of said frequency/amplitude $F_5A_3$ and enables the Static Audio Player 120 the activate, or save a binary "1" in, the $f_5a_3$ memory register within the Static Audio Player 120, and when the sequential parallel data replication of sound information by time interval from the frequency/amplitude memory registers reaches the point when sound information related to time interval $I_4$ is to be replicated from the frequency/amplitude memory registers, the Static Audio Player 120 invokes a sequential parallel data replication of sound information related to time interval $I_4$ from the frequency/amplitude memory registers to the sound card buffer memory, including said "1" in said fourth group of said third set of binary information in said data string associated with time interval $I_4$. Next, the Static Audio Player 120 invokes a sequential parallel data replication of all sound information related to time interval $I_4$ from the sound card buffer memory to the sound card of the host computer system, including said "1" in said fourth group of said third set of binary information in said data string associated with time interval $I_4$, and the sound card then relays/transmits sound information related to time interval $I_1$ to the Audio Output Device 190, including frequency/amplitude $F_5A_3$ thereby enabling playback, and/or replication, of frequency/amplitude $F_5A_3$ at time $t_4$. The "00101" in the first group of the fourth set of binary information in the data string associated with time interval $I_8$ identifies a discrete frequency $F_5$; the "0011" in the second group of the fourth set of binary information in the data string associated with time interval $I_8$ identifies the specific amplitude $A_3$ of said frequency $F_5$; the "0001000" in the third group of the fourth set of binary information in the data string associated with time interval $I_8$ identifies the time $t_8$ when said frequency/amplitude $F_5A_3$ is to cease to be played, and/or to cease to be replicated; and the "0" in the fourth group of the fourth set of binary information in the data string associated with time interval $I_8$ identifies the status $s_0$ of said frequency/amplitude $F_5A_3$ and enables the Static Audio Player 120 to deactivate, erase, or save a binary "0" in, the $f_5a_3$ memory register within the Static Audio Player 120, and when the sequential parallel data replication of sound information by time interval from the frequency/amplitude memory registers reaches the point when sound information related to time interval $I_8$ is to be replicated from the frequency/amplitude memory registers, the Static Audio Player 120 invokes a sequential parallel data replication of sound information related to time interval $I_8$ from the frequency/amplitude memory registers to the sound card buffer memory, including said "0" in said fourth group of said fourth set of binary information in said data string associated with time interval $I_8$. Next, the Static Audio Player 120 invokes a sequential parallel data replication of all sound information related to time interval $I_8$ from the sound card buffer memory to the sound card of the host computer system, including said "0" in said fourth group of said fourth set of binary information in said data string associated with time interval $I_8$, and the sound card then relays/transmits sound information related to time interval $I_8$ to the Audio Output Device 190, however, since said "0" in said fourth group of said fourth set of binary information in said data string associated with time interval $I_8$ is a signal to terminate playback of frequency/amplitude $F_5A_3$, the sound card terminates the relay/transmit of frequency/amplitude $F_5A_3$ to the Audio Output Device 190 thereby terminating playback, and/or replication, of frequency/amplitude $F_5A_3$ at time $t_8$.

As discussed above, the sound information saved in the $f_xa_y$ memory registers within in the Static Audio Player 120 can be obtained from the Static Audio File 110 one time interval at a time during real-time playback of the audio recording or the Static Audio Player 120 can obtain and schedule sound information changes for all time intervals $I_z$ in the audio recording, by each frequency/amplitude $F_xA_y$ from the Static Audio File 110 at, or prior to, the commencement of playback of the audio recording by sequentially replicating and sequentially saving sound information related to all, or a plurality of, time intervals $I_x$ from the Static Audio File 110 to the time interval buffer memory, then commencing the sequential parallel data dump from the time interval buffer memory to the frequency/amplitude memory registers. Additionally, the sound card buffer memory can be capable of sequentially storing sound information related to all, or a plurality of, time intervals $I_x$ from the frequency/amplitude memory registers, prior to when the Static Audio Player 120 commences the sequential parallel data dump from the sound card buffer memory to the sound card of the host computer system for subsequent relay/transmission to the Audio Output Device 190.

Furthermore, if in an audio recording, the amplitude $A_x$ of a certain frequency $F_x$ is to be lowered (or deactivated) by multiple amplitude levels, from one time interval to the next, the Static Audio File 110 could be structured to contain information on only the lowest amplitude $A_x$ to be deactivated. The Static Audio Player 120 could be structured to automatically deactivate (or erase) all amplitudes above said lowest amplitude $A_x$ upon receipt of instructions from the Static Audio File 110 to deactivate the said lowest amplitude $A_x$. As example, if the memory registers $f_1a_1$, $f_1a_2$, $f_1a_3$, $f_1a_4$, $f_1a_5$, $f_1a_6$, and $f_1a_7$ are active in some time interval $I_{13}$ and Static Audio Player 120 receives from the Static Audio File 110 the following algorithm "$I_{14}=F_1A_3t_{14}s_0$" expressed in binary terms as: $I_{14}$=00001 0011 0001110 0; then the memory registers $f_1a_3$, $f_1a_4$, $f_1a_5$, $f_1a_6$, and $f_1a_7$ will be deactivated, erased, or replaced with a binary "0", and the Static Audio Player 120 will cease playing, and/or replicating, $F_1A_3$, $F_1A_4$, $F_1A_5$, $F_1A_6$, and $F_1A_7$ at time $t_{14}$, however, the Static Audio Player 120 will continue to play, and/or replicate, frequency/amplitudes $F_1A_1$ and $F_1A_2$, since memory registers $f_1a_1$ and $f_1a_2$ have not been deactivated, erased, or replaced with a binary "0". Conversely, if in an audio recording, the amplitude $A_x$ of a certain frequency $F_x$ is to be increased (or activated) by multiple amplitude levels, the Static Audio File 110 could be structured to contain information on only the highest amplitude $A_x$ to be activated. The Static Audio Player 120 could be structured to automatically activate all amplitudes below said highest amplitude $A_x$ upon receipt of instructions from the Static Audio File 110 to activate the said highest amplitude $A_x$. As example, if the frequency/amplitude memory registers $f_2a_1$, $f_2a_2$, $f_2a_3$, and $f_2a_4$ are active in some time interval $I_{26}$ and the Static Audio Player 120 receives from the Static Audio File 110 the following algorithm "$I_{26}=F_2A_9t_{26}m_1$" expressed in binary terms as: $I_{26}$=00010 1001 0011010 1; then in addition to the memory registers $f_2a_1$, $f_2a_2$, $f_2a_3$, and $f_2a_4$ being active in time interval $I_{26}$, the Static Audio Player 120 will activate, or save a binary "1" in, the frequency/amplitude memory registers $f_2a_5$, $f_2a_6$, $f_2a_7$, $f_2a_8$, and $f_2a_9$, and the Static Audio Player 120 will commence playing frequency/amplitudes $F_2A_5$, $F_2A_6$, $F_2A_7$, $F_2A_8$, and $F_2A_9$ at time $t_{26}$, and the Static Audio Player 120 will continue to play frequency/amplitudes $F_2A_1$, $F_2A_2$, $F_2A_3$, and $F_2A_4$ since memory registers $f_2a_1$, $f_2a_2$, $f_2a_3$, and $f_2a_4$ continue to be active.

Additionally, the Static Audio Player 120 can be configured to contain one or more memory registers corresponding to each discrete frequency/amplitude $F_xA_y$, in which information from the Static Audio File 110 can be saved. As example, the frequency/amplitude information may be configured to be saved in a frequency $f_x$ memory register and an amplitude $a_y$ memory register corresponding with frequency/amplitude $F_xA_y$ rather than to the individual $f_xa_y$ frequency/amplitude memory register.

Additionally, instead of the Static Audio Player 120 containing a memory register for each possible amplitude of a frequency, the Static Audio Player 120 can be configured to contain a memory register for a frequency and the corresponding binary code for the corresponding amplitude would be saved in the memory register instead of only a binary "0" or a binary "1". By means of example, and using the previously described algorithm "$I_w=F_xA_yt_zs_m$", the Static Audio Player 120 functions as previously described, however, the Static Audio Player 120 would contain only one frequency memory register $f_x$ for each frequency $F_x$ instead of plurality of frequency/amplitude memory registers $f_xa_y$ for each such frequency $F_x$; and instead of storing a binary "0" or a binary "1" in said frequency memory register $f_x$, the binary code of the amplitude would be stored in said frequency memory register $f_x$. Using a portion of the previously discussed example, the Static Audio File 110 expressed in binary terms as: $I_1$=00001 0001 0000001 1 00010 0001 0000001 1 00010 0010 0000001 1; $I_4$=00101 0001 0000100 1 00101 0010 0000100 1 00101 0011 0000100 1; $I_6$=00010 0001 0000110 0 00010 0010 0000110 0; and $I_8$=00001 0001 0001000 0 00101 0001 0001000 0 00101 0010 0001000 0 00101 0011 0001000 0; which mathematically represents an audio recording whereby a sound $F_1A_1$ is to be played during time intervals $I_1$, $I_2$, $I_3$, $I_4$, $I_5$, $I_6$, and $I_7$; and sounds $F_2A_1$ and $F_2A_2$ are to be played during time intervals $I_1$, $I_2$, $I_3$, $I_4$, and $I_5$; and sounds $F_5A_1$, $F_5A_2$, and $F_5A_3$ are to be played during time intervals $I_4$, $I_5$, $I_6$, and $I_7$; and no sound is to be played in time interval $I_8$; the second group of the any set of binary information in the data strings identifies the amplitude code to be saved in, or erased from, the corresponding frequency memory register $f_x$ depending on the second group of the any set of binary information in the data strings.

Figure 2:
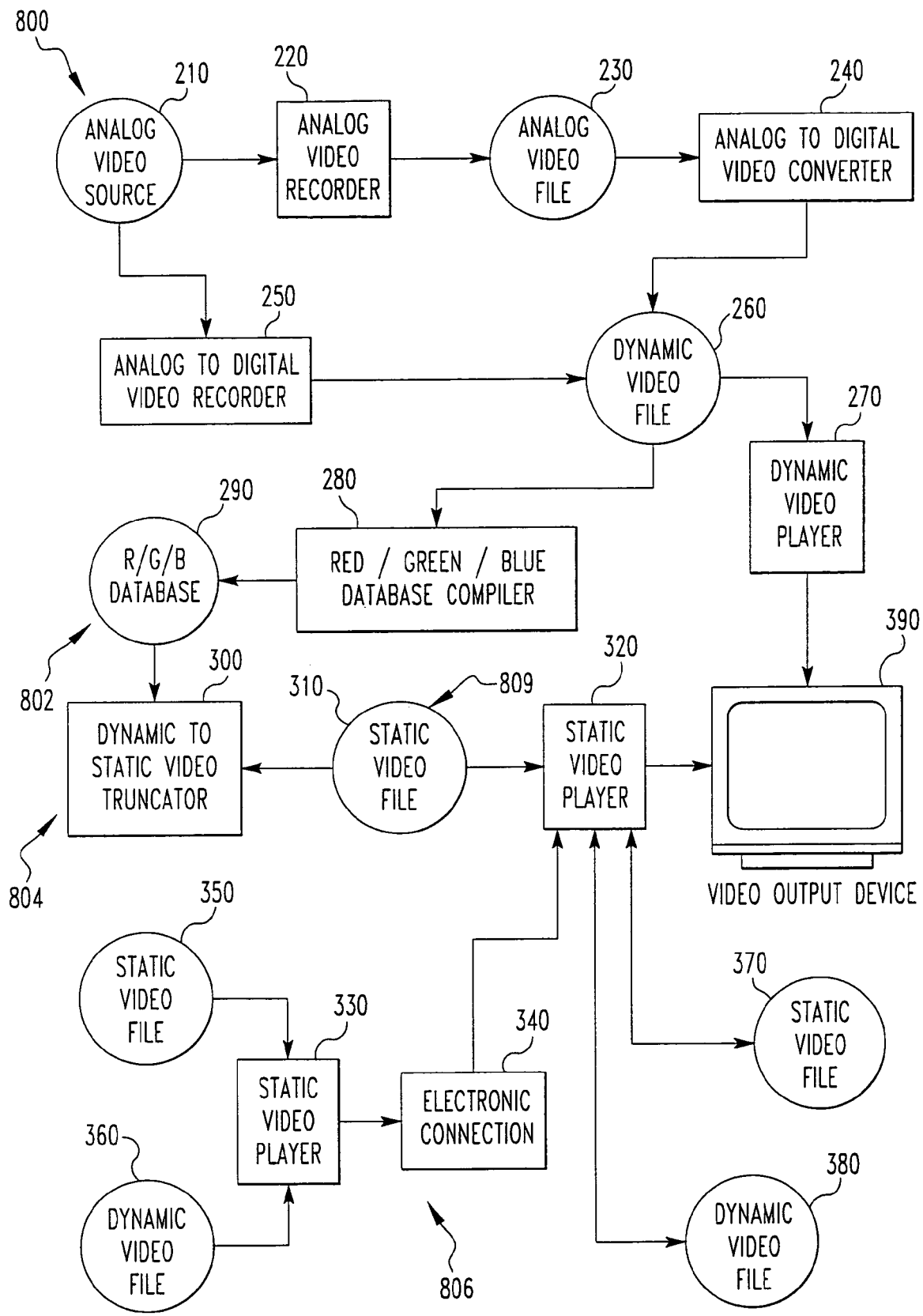
FIG. 2 is a pictorial flow chart which may be used in carrying out the teachings of this invention for the purpose of converting Dynamic Video Files into Static Video Files, and playback of such Static Video Files by means of a Static Video Player, and conversion of Static Video Files to Dynamic Video Files by means of a Static Video Player.

Referring now to the FIG. 2, another preferred embodiment of the invention is comprised of the following:
  210 Analog Video Source
  220 Analog Video Recorder
  230 Analog Video File
  240 Analog to Digital Video Converter
  250 Analog to Digital Video Recorder
  260 Dynamic Video File
  270 Dynamic Video Player
  280 Frequency/Amplitude Database Compiler
  290 Frequency/Amplitude Database
  300 Dynamic to Static Video Truncator
  310 Static Video File
  320 Static Video Player
  330 Static Video Player
  340 Electronic Connection
  350 Static Video File
  360 Dynamic Video File
  370 Static Video File
  380 Dynamic Video File
  390 Video Output Device In FIG. 2, the following components are already commercially available: the Analog Video Source 210; the Analog Video Recorder 220; the Analog Video File 230; the Analog to Digital Video Converter 240; the Analog to Digital Video Recorder 250; the Dynamic Video File 260, 360, and 380; the Dynamic Video Player 270; the Electronic Connection 340; and the Video Output Device 390. However, the Red/Green/Blue Database Compiler 280; the Red/Green/Blue Database 290; the Dynamic to Static Video Truncator 300; the Static Video File 310, 350, and 370; and the Static Video Player 320 and 330; would be designed specifically to meet the teachings of this invention.

The Analog Video Source 210 is the originating source of a video recording in the configuration as outlined in FIG. 2.

The Analog Video Recorder 220 (i.e. VHS Video Cassette Recorder, BETA Video Cassette Recorder, etc.) is the means by which the Analog Video Source 210 can be recorded in either analog form or digital form.

The Analog Video File 230 is the resulting analog video file produced by the Analog Video Recorder 220.

The Analog to Digital Video Converter 240 is the means by which an Analog Video File 230 is converted into a digital video file format.

The Analog to Digital Video Recorder 250 is the means by which the Analog Video Source 210 can be recorded directly into a digital video file format.

The Dynamic Video File 260 (i.e. MPEG, etc.) is encoded in a dynamic digital file format which contains basic, and/or complex, color information by pixel by video frame and can be produced by either the Analog to Digital Video Converter 240 or the Analog to Digital Video Recorder 250. The Dynamic Video File 260 is formatted in the same dynamic digital video file format as the Dynamic Video File 360 and 380.

The Dynamic Video Player 270 is a means to playback a Dynamic Video File 260.

Figure 14:
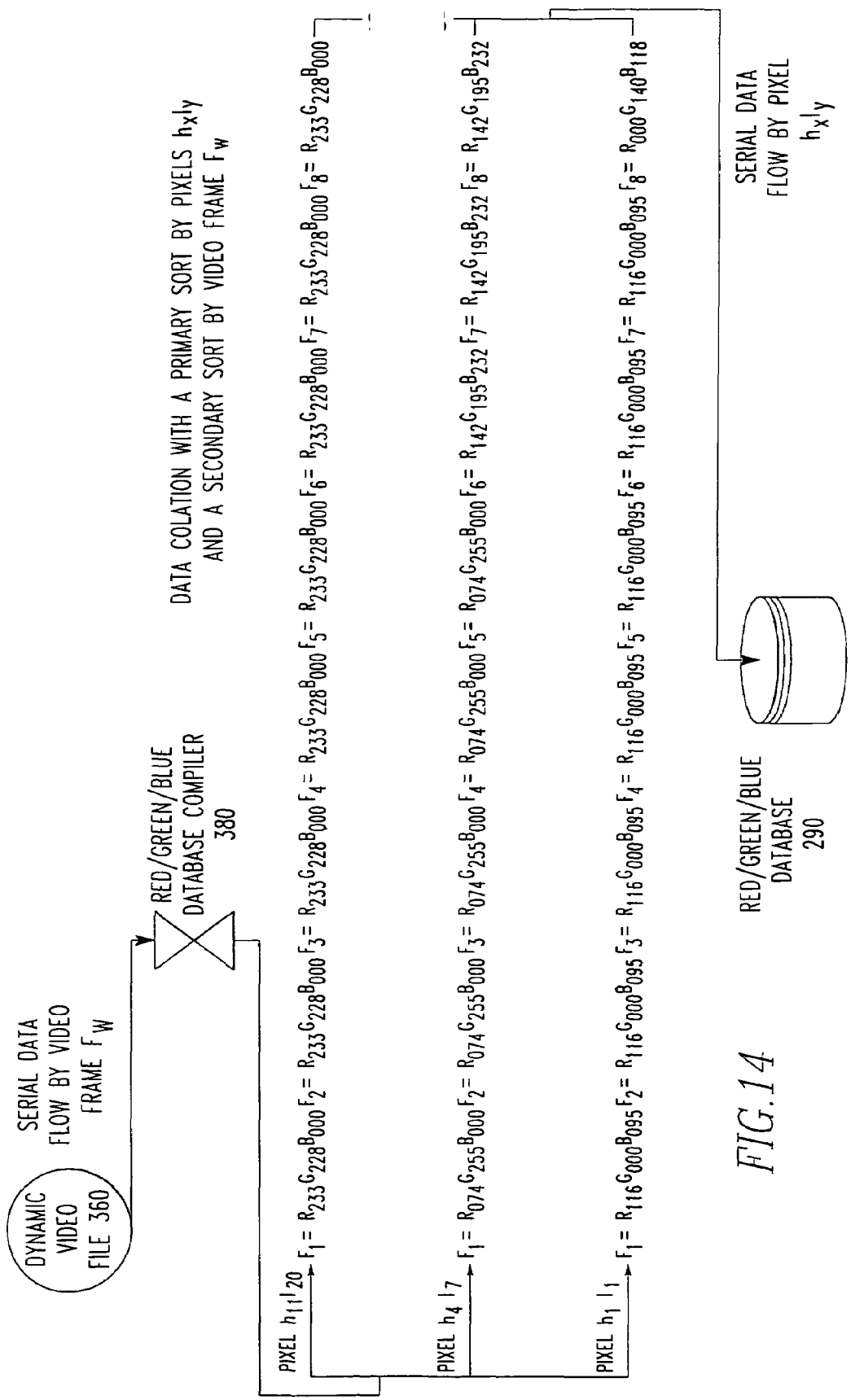
FIG. 14 is a computer flow chart depicting the various functions of the Red/Green/Blue Database Compiler 280.

The Red/Green/Blue Database Compiler 280 is the means by which data contained in the Dynamic Video File 260 is accessed and inputted into the Red/Green/Blue Database Compiler 280 and is compiled to create the Red/Green/Blue Database 290. The Red/Green/Blue Database Compiler 280 is a computer software program, to be executed on a computer system, which can be written by one skilled in the art of video database creation (see FIG. 14).

The Red/Green/Blue Database 290 is composed of a plurality of video frames composed of a matrix of pixels, each pixel contains data representing a specific complex color which may be defined by various shades of the basic colors red, green, and blue.

Figure 15:
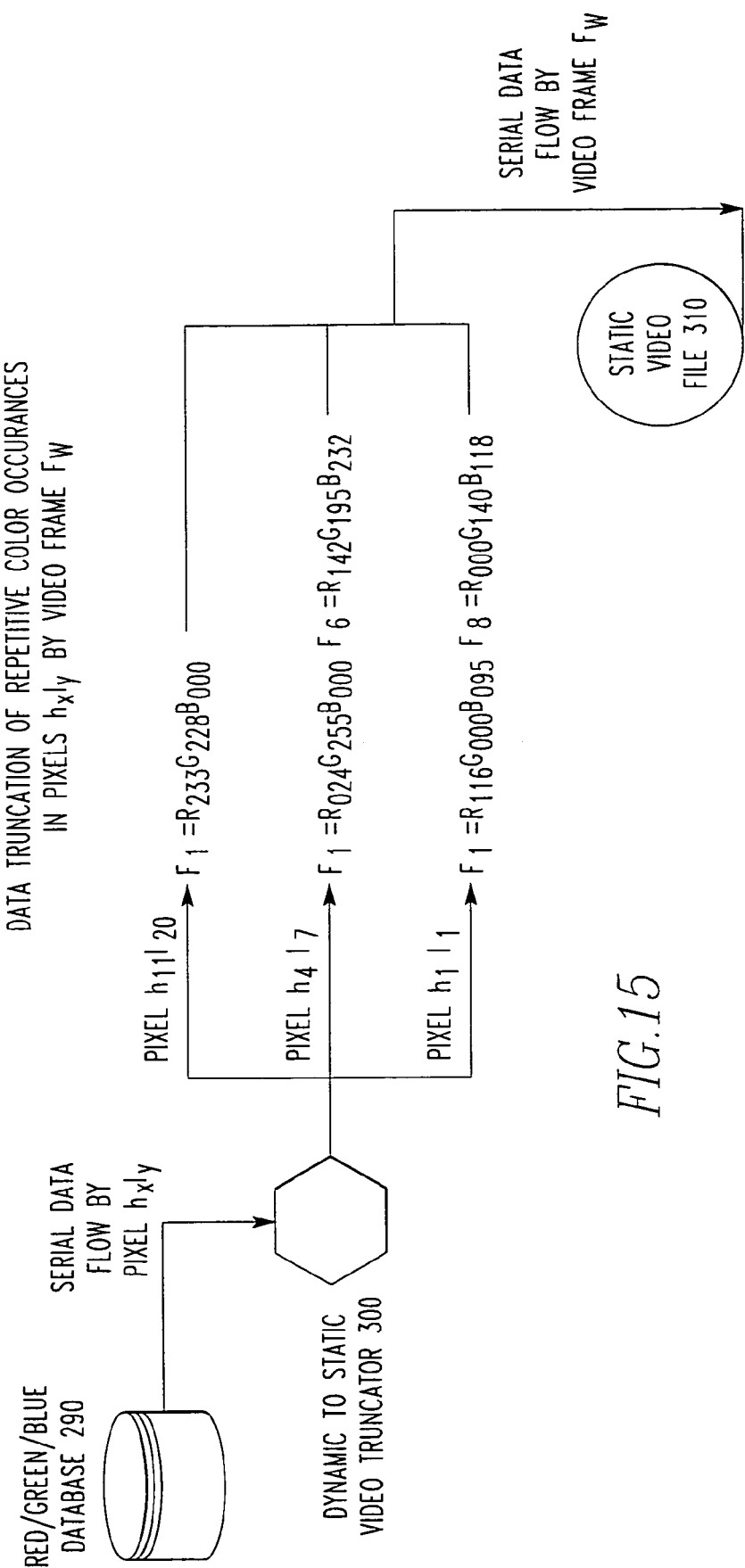
FIG. 15 is a computer flow chart depicting the various functions of the Dynamic to Static Video Truncator 300.

The Dynamic to Static Video Truncator 300 is the means by which repetitive data contained in the Red/Green/Blue Database 290 is truncated to contain specific color information by pixel and the related the starting points each such color is to commence to be displayed, and/or commence to be replicated, within each such pixel, with respect to time, and removes any repetitive data between said starting point and said ending point and creates the Static Video File 310. The Dynamic to Static Video Truncator 300 is a computer software program, to be executed on a conventional computer system, which can be written by one skilled in the art of video database creation (see FIG. 15).

The Static Video File 310 is encoded in a digital file format which records basic color information of the red/green/blue components of specific complex colors to be displayed, and/or replicated, within discrete pixels on a Video Output Device 390 and the related starting points each such specific complex color is to commence to be displayed, and/or commence to be replicated, within each such pixel, for one or more consecutive video frames, with respect to time and can be produced by the Dynamic to Static Video Truncator 300. The Static Video File 310 is encoded in a format which is compatible for use by the Static Video Player 320 and 330, and can be saved on the hard disk of a conventional computer system. The Static Video File 310 is formatted in the same digital video file format as the Static Video File 350 and 370.

The Static Video File 310 and the Static Audio File 110 may be combined into one file for use by a device which is the combination of the Static Video Player 320 and the Static Audio Player 120.

The Static Video Player 320 is a computer software program executed by a conventional computer system. The Static Video Player 320 is a means by which display of the Static Video File 310 through the video card of the host computer system is possible in either digital audio form or analog audio form. The Static Video Player 320 is designed to process the encoded information of the Static Video File 310 for subsequent video display and/or replication. The Static Video Player 320 invokes a sequential serial replication (i.e. a serial data replication is the process whereby the original copy of data is replicated, transmitted, and saved in series to a buffer memory) of color information from the Static Video File 310 and saves said color information into a video frame buffer memory within the Static Video Player 320. Next, the Static Video Player 320 invokes a sequential parallel data dump of said color information by video frame from the video frame memory buffer into a matrix of red/green/blue memory registers within the Static Video Player 320. Next, the Static Video Player 320 invokes a sequential parallel data replication of the color information in the red/green/blue memory registers to the video card buffer memory within the Static Video Player 320. Next, the Static Video Player 320 invokes a sequential parallel data dump of the color information in the video card buffer memory to the video card of the host computer system, whereupon the video card relays/transmits the color information to the Video Output Device 390. Each red/green/blue memory register is pre-assigned, or corresponds, to a specific pixel on a Video Output Device 390. The Static Video Player 320 saves red/green/blue color information from the Static Video File 310 into corresponding red/green/blue memory registers. The Static Video Player 320 generates complex colors from the red/green/blue color information. The Static Video Player 320 displays complex colors, generated from the red/green/blue color information saved in the red/green/blue memory registers, within the corresponding pixels on a Video Output Device 390. As the color information saved in the red/green/blue memory registers changes from video frame to video frame, the complex color displayed within the corresponding pixels on a Video Output Device 390 changes accordingly. The Static Video Player 320 may be configured to contain the functionality of the Dynamic Video Player 270, the Red/Green/Blue Database Compiler 280, and the Dynamic to Static Video Truncator 300.

The Static Video Player 320 is also a means to playback the Static Video File 310, 350, and/or 370 in dynamic digital form on a Video Output Device 390 (i.e. digital video monitor, digital television set, etc.); or playback in analog form on a Video Output Device 390 (i.e. analog video monitor, analog television set, etc.) for view by the user. The Static Video Player 320 can playback the Static Video File 310, 350, and/or 370 in static digital form to save computational instructions as a Static Video File 370. The Static Video Player 320 can playback the Static Video File 310, 350, and/or 370 in dynamic digital form to save computational instructions as a Dynamic Video File 380.

Additionally, the Static Video Player 320 is a means to playback the Dynamic Video File 360 and/or 380 in dynamic digital form on a Video Output Device 390 (i.e. digital video monitor, digital television set, etc.); or playback in analog form on a Video Output Device 390 (i.e. analog video monitor, analog television set, etc.) for view by the user. The Static Video Player 320 can playback the Dynamic Video File 360 and/or 380 in static digital form to save computational instructions as a Static Video File 370. The Static Video Player 320 can playback the Dynamic Video File 360 and/or 380 in dynamic digital form to save computational instructions as a Dynamic Video File 380.

Furthermore, the Static Video Player 320 can receive computational instructions from a Static Video File 350 or a Dynamic Video File 360 (i.e. in broadcast fashion, download fashion (i.e. U.S. Pat. No. 5,191,573), etc.) by means of the Static Video Player 330 via an Electronic Connection 340 (such as, but not limited to, transmission via: direct connect network, satellite, cable TV, coax cable, fiber optics, fiber/coax hybrid, Internet, cellular, microwave, radio, twisted pair telephone, ISDN telephone, T-1 telephone, DS-3 telephone, OC-3 telephone, etc.).

The Static Video Player 320 and the Static Audio Player 120 may be combined into one device enabling the simultaneous playback of recordings which are the combination of the Static Video File 310 and the Static Audio File 110.

The Static Video Player 330 is a means by which a Static Video File 350 and/or a Dynamic Video File 360 may be electronically transmitting (i.e. in broadcast fashion, download fashion (i.e. U.S. Pat. No. 5,191,573), etc.) to a Static Video Player 320 via an Electronic Connection 340 for subsequent or real-time playback by the Static Video Player 320.

The Electronic Connection 340 (such as, but not limited to, transmission via: direct connect network, satellite, cable TV, coax cable, fiber optics, fiber/coax hybrid, Internet, cellular, microwave, radio, twisted pair telephone, ISDN telephone, T-1 telephone, DS-3 telephone, OC-3 telephone, etc.) is a means by which a Static Video Player 330 of a first computer system and a Static Video Player 320 of a second computer system can be electronically connected. The Static Video Player 320 and the Static Video Player 330 may be configured to have all, or some, of the same functionality and capabilities as the other.

The Static Video File 350 is encoded in a digital file format which records basic color information of the red/green/blue components of specific complex colors to be displayed, and/or replicated, within discrete pixels on a Video Output Device 390 and the related starting points each such complex color is to commence to be displayed, and/or commence to be replicated, within each such pixel for one or more consecutive video frames, with respect to time. The Static Video File 350 is formatted in the same digital video file format as the Static Video File 310 and 370.

The Dynamic Video File 360 (i.e. MPEG, etc.) is encoded in a file format which contains basic color, and/or complex color, information by pixel by video frame. The Dynamic Video File 360 is formatted in the same digital video file format as the Dynamic Video File 260 and 380.

The Static Video File 370 is encoded in a digital file format which records basic color information of the red/green/blue components of specific complex colors to be displayed, and/or replicated, within discrete pixels on a Video Output Device 390 and the related starting points each such complex color is to commence to be displayed, and/or commence to be replicated, within each such pixel, for one or more consecutive video frames, with respect to time and can be produced by the Static Video Player 310. The Static Video File 370 is formatted in the same digital video file format as the Static Video File 310 and 350.

The Dynamic Video File 380 (i.e. MPEG, etc.) is encoded in a digital file format which contains basic color, and/or complex color, information by pixel by video frame and can be produced by the Static Video Player 320. The Dynamic Video File 380 is formatted in the same digital video file format as the Dynamic Video File 260 and 360.

The Video Output Device 390 (i.e. computer monitor, television set, video monitor, etc.) is the means by which an image is produced, in either digital or analog form, for view when the Static Video File 310, 350, and/or 370 or the Dynamic File 360 and/or 380 is played by means of the Static Video Player 320. The Video Output Device 390 is electronically connected to, and receives color information by pixel from, a computer video card. The Video Output Device 390 can be either a digital device or an analog device.

With respect to FIG. 2, the invention records an Analog Video Source 210, being any form of a video recording, through use of the Analog Video Recorder 220, which is a device which records, and/or plays, analog video signals (i.e. VHS Video Cassette Recorder, BETA Video Cassette Recorder, etc.), or through use of the Analog to Digital Video Recorder 250. The Analog to Digital Video Recorder 250 is a device which can convert analog video signals directly into digital video signals, can record digital video signals, and which can playback digital video signals. If the Analog Video Recorder 220 is utilized, an Analog Video File 230 is created. The Analog to Digital Video Converter 240, a device which converts analog video signals into digital video signals, creates a Dynamic Video File 260 from the Analog Video File 230.

The Dynamic Video File 260 is created in a dynamic digital video file format (i.e. MPEG). If the Analog to Digital Video Recorder 250 is used, the Dynamic Video File 260 is directly created. As example, and assuming that a Dynamic Video File 260 is composed a plurality of video frames (F), where $F_w$ identifies a discrete video frame within a range of sequentially positioned video frames identified by subscript "w" which is bounded by the first video frame and last video frame of the video recording; and each such video frame $F_w$ is composed of discrete pixels which are mathematically expressed as, and/or are located by, height (h) and length (l), where (h) is a vertical Euclidean axis at right angle to (l), which is a horizontal Euclidean axis, and $h_x$ identifies a discrete location along the (h) axis within a range of locations identified by subscript "x", and $l_y$ identifies a discrete location along the (l) axis within a range of locations identified by subscript "y", and the intersection of $h_x$ and $l_y$ identifies a discrete video location, known as a pixel $h_x l_y$, within the area bounded by the (h) axis and the (l) axis; and complex colors are composed of a mixture of the basic colors red (R), green (G), and blue (B), where $R_v G_v B_v$ identifies discrete shades of red, green, and blue, respectively, within a range of shades from 0 to 255 identified by subscript "v"; and further assuming that the following information after the equals sign is expressed in binary terms: $h_1$=00001; $h_4$=00100; $h_{11}$=01011; $l_1$=00001; $l_7$=00111; $l_{20}$=10100; $R_{000}$=00000000; $R_{074}$=01001010; $R_{116}$=01110100; $R_{142}$=10001110; $R_{233}$=11101001; $G_{000}$=00000000; $G_{140}$=10001100; $G_{195}$=11000011; $G_{228}$=11100100; $G_{255}$=11111111; $B_{000}$=00000000; $B_{095}$=01011111; $B_{118}$=01110110; and $B_{232}$=11101000; the Dynamic Video File 260 mathematically represents a video recording as the algorithm "$F_w = h_x l_y R_v G_v B_v$", and expressed in binary terms as: $F_1$=00001 00001 01110100 00000000 01011111 00100 00111 01001010 11111111 00000000 01011 10100 11101001 11100100 00000000; $F_2$=00001 00001 01110100 00000000 01011111 00100 00111 01001010 11111111 00000000 01011 10100 11101001 11100100 00000000; $F_3$=00001 00001 01110100 00000000 01011111 00100 00111 01001010 11111111 00000000 01011 10100 11101001 11100100 00000000; $F_4$=00001 00001 01110100 00000000 01011111 00100 00111 01001010 11111111 00000000 01011 10100 11101001 11100100 00000000; $F_5$=00001 00001 01110100 00000000 01011111 00100 00111 01001010 11111111 00000000 01011 10100 11101001 11100100 00000000; $F_6$=00001 00001 01110100 00000000 01011111 00100 00111 10001110 11000011 11101000 01011 10100 11101001 11100100 00000000; $F_7$=00001 00001 01110100 00000000 01011111 00100 00111 10001110 11000011 11101000 01011 10100 11101001 11100100 00000000; and $F_8$=00001 00001 00000000 10001100 01110110 00100 00111 10001110 11000011 11101000 01011 10100 11101001 11100100 00000000; which mathematically represents a video recording whereby a shade of purple ($R_{116} G_{000} B_{095}$) is to be displayed within pixel $h_1 l_1$ on a Video Output Device 390 in video frames $F_1, F_2, F_3, F_4, F_5, F_6$, and $F_7$, then in video frame $F_8$ a shade of teal ($R_{000} G_{140} B_{118}$) is to be displayed within pixel $h_1 l_1$; a shade of lime green ($R_{074} G_{255} B_{000}$) is to be displayed within pixel $h_4 l_7$ on a Video Output Device 390 in video frames $F_1, F_2, F_3, F_4$, and $F_5$, then in video frames $F_6, F_7$, and $F_8$ a shade of powder blue ($R_{142} G_{195} B_{232}$) is to be displayed within pixel $h_4 l_7$; and a shade of lemon yellow ($R_{233} G_{228} B_{000}$) is to be displayed within pixel $h_{11} l_{20}$ on a Video Output Device 390 in video frames $F_1, F_2, F_3, F_4, F_5, F_6, F_7$, and $F_8$ (see FIG. 16). The data string for each video frame $F_w$ is composed of sets of five groups of binary information, each set contains binary information for a pixel $h_x l_y$, the first and second groups of binary information in a set identify a pixel $h_x l_y$, the third group of binary information in a set identifies red color information $R_v$, the fourth group of binary information in a set identifies green color information $G_v$, and the fifth group of binary information in a set identifies blue color information $B_v$. The "00001 00001" in the first and second groups of the first set of binary information in the data string associated with video frame $F_1$ identify the pixel $h_1 l_1$; the "01110100 00000000 01011111" in the third, fourth, and fifth groups of the first set of binary information in the data strings associated with video frames $F_1, F_2, F_3, F_4, F_5, F_6$, and $F_7$ identify a shade of purple, being a complex color generated by the mixture of the basic colors $R_{116} G_{000} B_{095}$ to be displayed within pixel $h_1 l_1$ on a Video Output Device 390. The "00001 00001" in the first and second groups of the first set of binary information in the data string associated with video frame $F_8$ identify the pixel $h_1 l_1$; the "00000000 10001100 01110110" in the third, fourth, and fifth groups of the first set of binary information in the data string associated with video frame $F_8$ identify a shade of teal, being a complex color generated by the mixture of the basic colors $R_{000} G_{140} B_{118}$, to be displayed within pixel $h_1 l_1$ on a Video Output Device 390. The "00100 00111" in the first and second groups of the second set of binary information in the data string associated with video frames $F_1, F_2, F_3, F_4$, and $F_5$ identify the pixel $h_4 l_7$; the "01001010 11111111 00000000" in the third, fourth, and fifth groups of the second set of binary information in the data strings associated with video frames $F_1, F_2, F_3, F_4$, and $F_5$ identify a shade of lime green, being a complex color generated by the mixture of the basic colors $R_{074} G_{255} B_{000}$, to be displayed within pixel $h_4 l_7$ on a Video Output Device 390. The "00100 00111" in the first and second groups of the second set of binary information in the data string associated with video frames $F_6, F_7$, and $F_8$ identify the pixel $h_4 l_7$; the "10001110 11000011 11101000" in the third, fourth, and fifth groups of the second set of binary information in the data string associated with video frames $F_6, F_7$, and $F_8$ identify a shade of powder blue, being a complex color generated by the mixture of the basic colors $R_{142} G_{195} B_{232}$, to be displayed within pixel $h_4 l_7$ on a Video Output Device 390. The "01011 10100" in the first and second groups of the third set of binary information in the data string associated with video frames $F_1, F_2, F_3, F_4, F_5, F_6, F_7$, and $F_8$ identify the pixel $h_{11} l_{20}$; the "11101001 11100100 00000000" in the third, fourth, and fifth groups of the third set of binary information in the data strings associated with video frames $F_1, F_2, F_3, F_4, F_5, F_6, F_7$, and $F_8$ identify a shade of lemon yellow, being a complex color generated by the mixture of the basic colors $R_{233} G_{228} B_{000}$, to be displayed within pixel $h_{11} l_{20}$ on a Video Output Device 390. The Dynamic Video File 260 records color information to be displayed in each pixel of a Video Output Device 390 for each, and every, video frame.

Playback of the Dynamic Video File 260 is accomplished by means of a Dynamic Video Player 270, which is a device which can play the Dynamic Video File 260. The Dynamic Video Player 270 receives color information from the Dynamic Video File 260 for playback one video frame at a time (see FIG. 17).

The Red/Green/Blue Database Compiler 280 is a computer software program to be executed by the host computer system, which inputs color information from a Dynamic Video File 260 into the Red/Green/Blue Database Compiler 280 and creates a Red/Green/Blue Database 290. As example, the Red/Green/Blue Database 290 can be composed of a three-dimensional matrix defined by three axes, video frame (F), video frame height (h), and video frame length (l). A video frame $F_w$, where subscript "w" represents the range of video frames bounded by the first video frame and the last video frame of the video recording, is composed of a plurality of discrete pixels. The location of each such pixel $h_x l_y$ can be determined using a typical Euclidean coordinate system with video frame height (h) at right angle to video frame length (l), where subscript "x" represents the relative position along the (h) axis, and subscript "y" represents the relative position along the (l) axis. Each pixel contains a complex color composed of a mixture of the basic colors red (R), green (G), and blue (B), where $R_v G_v B_v$ identifies discrete shades of red, green, and blue respectively, within a range of shades identified by subscript "v". As example, white, being a complex color can be mathematically expressed as the mixture of the basic colors $R_{255}G_{255}B_{255}$, and black, being a complex color can be mathematically expressed as the mixture of the basic colors $R_{000}G_{000}B_{000}$, where the total possible shades identified by subscript "v" range from 000 to 255. These shades of basic colors, could be represented in binary terms as: 000=00000000; 001=00000001; 002=00000010; . . . 040=00101000; and so forth with 255=11111111. Therefore, a shade of purple, being a complex color can be mathematically expressed as the mixture of the basic colors $R_{116}G_{000}B_{095}$, is expressed in binary terms as "01110100 00000000 01011111" where $R_{116}$=01110100, $G_{000}$=0000000, and $B_{095}$=01011111. The number of shades of the basic colors red, green, and blue, and the number of video frames per second, and the number of pixels per video frame can vary from application to application. The Red/Green/Blue Database Compiler 280 accesses the color information in the Dynamic Video File 260 and invokes a serial data replication of said color information to the Red/Green/Blue Database Compiler 280 (see FIG. 14). Next, the Red/Green/Blue Database Compiler 280 performs a sort routine with a primary sort by pixel $h_x l_y$ and a secondary sort by video frame $F_w$ (first video frame first, last video frame last). Next, the Red/Green/Blue Database Compiler 280 saves said sorted/collated color information as a Red/Green/Blue Database 290. The Red/Green/Blue Database Compiler 280 can save the Red/Green/Blue Database 290 on the computer hard disk of said host computer system. The Red/Green/Blue Database Compiler 280 can electronically relay/transmit the Red/Green/Blue Database 290 directly to the Dynamic to Static Video Truncator 300.

Furthermore, the invention utilizes the Dynamic to Static Video Truncator 300, which is a computer software program to be executed by the host computer system, to mathematically analyze the matrix of the Red/Green/Blue Database 290 and identify patterns of specific complex colors, and/or basic colors, to be displayed, and/or replicated, within discrete pixels for one or more consecutive video frames, and records only the start point and finish point of any consecutive repetitions of color information corresponding to any pixel $h_x l_y$, with respect to time, and the Dynamic to Static Video Truncator 300 saves such truncated information in a Static Video File 310. The Dynamic to Static Video Truncator 300 accesses the sorted/collated color information in the Red/Green/Blue Database 290 and invokes a serial data dump/replication of said color information to the Dynamic to Static Video Truncator 300 (see FIG. 15). Next, the Dynamic to Static Video Truncator 300 identifies repetition strings of identical color information in pixels $h_x l_y$ over video frames $F_w$. Next, the Dynamic to Static Video Truncator 300 erases the second occurrence and all subsequent occurrences of color information in the repetition strings related to the corresponding pixels $h_x l_y$ over the corresponding video frames $F_w$. At this point, the color information has been truncated and the only remaining color information with respect to said repetition strings of identical color information in pixels $h_x l_y$ over video frames $F_w$ are the starting points of said repetition strings. Next, the Dynamic to Static Video Truncator 300 performs a sort routine of said truncated color information with a primary sort by video frame $F_w$ (first video frame first, last video frame last) and a secondary sort by pixels $h_x l_y$. Next, the Dynamic to Static Video Truncator 300 saves said sorted and truncated color information as a Static Video File 310. The Dynamic to Static Video Truncator 300 can save the Static Video File 310 on the computer hard disk of said host computer system. The Dynamic to Static Video Truncator 300 can electronically relay/transmit the Static Video File 310 directly to the Static Video Player 320.

Figure 5:
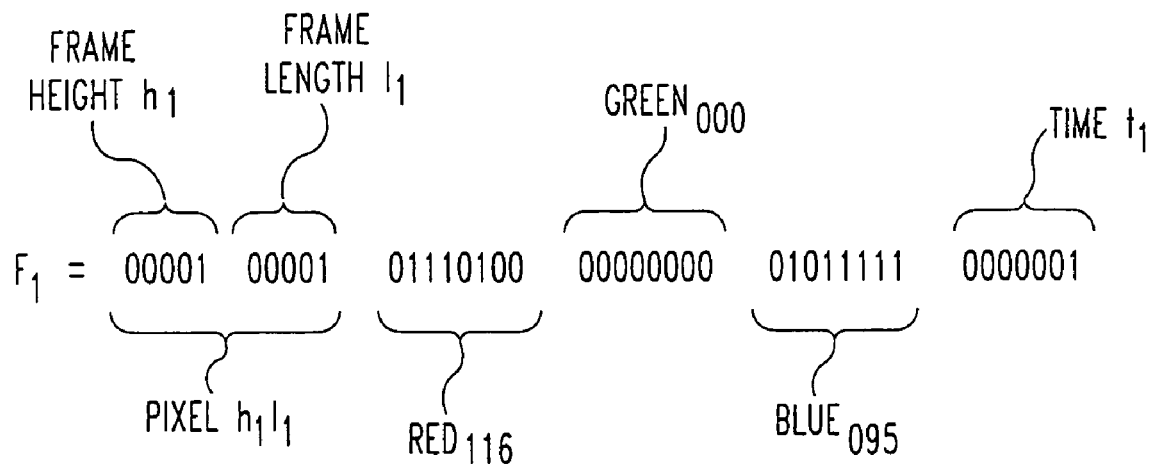
FIG. 5 and FIG. 6 are computer algorithms which detail possible configurations of the computer file format for the Static Video File.
Figure 6:
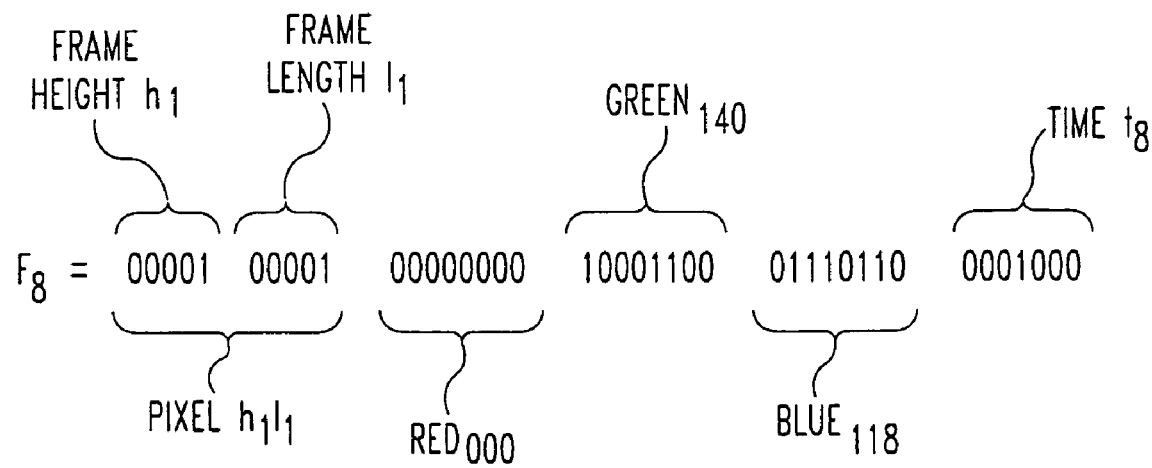

The Static Video File 310 contains information such as, but not limited to, specific complex and/or basic colors to be displayed, and/or replicated, within discrete pixels on a Video Output Device 390 and the related starting points each such complex color is, and/or basic colors are, to be displayed, and/or replicated, within each such pixel for one or more consecutive video frames, with respect to time. As example, and assuming that a Static Video File 310 is composed a plurality of video frames (F), where $F_w$ identifies a discrete video frame within a range of sequential video frames identified by subscript "w", and bounded by the first video frame and last video frame of the video recording; and each such video frame $F_w$ is composed of discrete pixels which are mathematically expressed as, and/or located by, height (h) and length (l), where (h) is a vertical Euclidean axis at right angle to (l), which is a horizontal Euclidean axis, and $h_x$ identifies a discrete location along the (h) axis within a range of locations identified by subscript "x", and $l_y$ identifies a discrete location along the (l) axis within a range of locations identified by subscript "y", and the intersection of $h_x$ and $l_y$ identifies a discrete location, or pixel $h_x l_y$, within the area bounded by the (h) axis and the (l) axis of the Video Output Device 390; and complex colors are composed a mixture of the basic colors red (R), green (G), and blue (B), where $R_v G_v B_v$ where subscript "v" identify discrete shades of red, green, and blue, respectively, within a range of shades from 0 to 255; and time $t_z$ identifies a discrete moment in time within a range of time identified by the subscript "z" which is bounded by the start time and finish time of the video recording, and $t_z$ identifies when the basic colors $R_v G_v B_v$ corresponding to video frame $F_w$ are to commence to be displayed, and/or commence to be replicated, within pixel $h_x l_y$ on a Video Output Device 390; and further assuming the following information after the equals sign is expressed in binary terms: $h_1$=00001; $h_4$=00100; $h_{11}$=01011; $l_1$=00001; $l_7$=00111; $l_{20}$=10100; $R_{000}$=00000000; $R_{074}$=01001010; $R_{116}$=01110100; $R_{142}$=10001110; $R_{233}$=11101001; $G_{000}$=00000000; $G_{140}$=10001100; $G_{195}$=11000011; $G_{228}$=11100100; $G_{255}$=11111111; $B_{000}$=0000000; $B_{095}$=01011111; $B_{118}$=01110110; and $B_{232}$=11101000; $t_1$=0000001; $t_2$=0000010; $t_3$=0000011; $t_4$=0000100; $t_5$=0000101; $t_6$=0000110; $t_7$=0000111; and $t_8$=0001000; the Static Video File 310 mathematically represents the same video recording as used in the previous example for the Dynamic Video File 260, as the algorithm "$F_w$=$h_x l_y R_v G_v B_v t_z$" and expressed in binary terms as: $F_1$=00001 00001 01110100 00000000 01011111 0000001 00100 00111 01001010 11111111 00000000 0000001 01011 10100 11101001 11100100 00000000 0000001; $F_6$=00100 00111 10001110 11000011 11101000 0000110; $F_8$=00001 00001 00000000 10001100 01110110 0001000; which mathematically represents a video recording whereby a shade of purple ($R_{116}G_{000}B_{095}$) is to be displayed within pixel $h_1 l_1$ of a Video Output Device 390 in video frames $F_1$, $F_2$, $F_3$, $F_4$, $F_5$, $F_6$, and $F_7$, then in video frame $F_8$ a shade of teal ($R_{000}G_{140}B_{118}$) is to be displayed within pixel $h_1 l_1$; a shade of lime green ($R_{074}G_{255}B_{000}$) is to be displayed within pixel $h_4 l_7$ on a Video Output Device 390 in video frames $F_1$, $F_2$, $F_3$, $F_4$, and $F_5$, then in video frames $F_6$, $F_7$, and $F_8$ a shade of powder blue ($R_{142}G_{195}B_{232}$) is to be displayed within pixel $h_4 l_7$; and a shade of lemon yellow ($R_{233}G_{228}B_{000}$) is to be displayed within pixel $h_{11} l_{20}$ on a Video Output Device 390 in video frames $F_1$, $F_2$, $F_3$, $F_4$, $F_5$, $F_6$, $F_7$, and $F_8$ (see FIG. 18). The data string for each video frame $F_w$ is composed of sets of six groups of binary information, the first and second groups of binary information in a set identify a pixel $h_x l_y$, the third group of binary information in a set identifies red color information $R_v$, the fourth group of binary information in a set identifies green color information $G_v$, the fifth group of binary information in a set identifies blue color information $B_v$, and the sixth group of binary information in a set identifies a discrete time $t_v$. The "00001 00001" in the first and second groups of the first set of binary information in the data string associated with video frame $F_1$ identify pixel $h_1l_1$; the "01110100 00000000 01011111" in the third, fourth, and fifth groups of the first set of binary information in the data string associated with video frame $F_1$ identify a shade of purple, being a complex color generated by the mixture of the basic colors $R_{116}G_{000}B_{095}$; and the "0000001" in the sixth group of binary information in the data string associated with video frame $F_1$ identifies the time $t_1$ when the Static Video Player 320 is to commence to display said shade of purple ($R_{116}G_{000}B_{095}$) within pixel $h_1l_1$ on a Video Output Device 390 and continue to replicate said shade of purple ($R_{116}G_{000}B_{095}$) within pixel $h_1l_1$ on a Video Output Device 390 during all subsequent video frames until instructed otherwise, and in this example those video frames are $F_2$, $F_3$, $F_4$, $F_5$, $F_6$, and $F_7$, (see FIG. 5). The "00001 00001" in the first and second groups of the only set of binary information in the data string associated with video frame $F_8$ identify pixel $h_1l_1$; the "00000000 10001100 01110110" in the third, fourth, and fifth groups of the only set of binary information in the data string associated with video frame $F_8$ identify a shade of teal, being a complex color generated by the mixture of the basic colors $R_{000}G_{140}B_{118}$; and the "0001000" the sixth group of the only set of binary information in the data string associated with video frame $F_8$ identifies the time $t_8$ when the Static Video Player 320 is to commence to display said shade of teal ($R_{000}G_{140}B_{118}$) within pixel $h_1l_1$ on a Video Output Device 390 (see FIG. 6). The "00100 00111" in the first and second groups of the second set of binary information in the data string associated with video frame $F_1$ identify pixel $h_4l_7$; the "01001010 11111111 00000000" in the third, fourth, and fifth groups of the second set of binary information in the data string associated with video frame $F_1$ identify a shade of lime green, being a complex color generated by the mixture of the basic colors $R_{074}G_{255}B_{000}$; and the "0000001" in the sixth group of the second set of binary information in the data string associated with video frame $F_1$ identifies the time $t_1$ when the Static Video Player 320 is to commence to display said shade of lime green ($R_{074}G_{255}B_{000}$) within pixel $h_4l_7$ on a Video Output Device 390 and continue to replicate said shade of lime green ($R_{074}G_{255}B_{000}$) within pixel $h_4l_7$ on a Video Output Device 390 during all subsequent video frames until instructed otherwise, and in this example those video frames are $F_2$, $F_3$, $F_4$, and $F_5$. The "00100 00111" in the first and second groups of the only set of binary information in the data string associated with video frame $F_6$ identify pixel $h_4l_7$; the "10001110 11000011 11101000" in the third, fourth, and fifth groups of the only set of binary information in the data string associated with video frame $F_6$ identify a shade of powder blue, being a complex color generated by the mixture of the basic colors $R_{142}G_{195}B_{232}$; and the "0000110" the sixth group of the only set of binary information in the data string associated with video frame $F_6$ identifies the time $t_6$ when the Static Video Player 320 is to commence to display said shade of powder blue ($R_{142}G_{195}B_{232}$) within pixel $h_4l_7$ on a Video Output Device 390 and continue to replicate said shade of powder blue ($R_{142}G_{195}B_{232}$) within pixel $h_4l_7$ on a Video Output Device 390 during all subsequent video frames until instructed otherwise, and in this example those video frames are $F_7$ and $F_8$. The "01011 10100" in the first and second groups of the third set of binary information in the data string associated with video frame $F_1$ identify pixel $h_{11}l_{20}$; the "11101001 11100100 00000000" in the third, fourth, and fifth groups of the third set of binary information in the data string associated with video frame $F_1$ identify a shade of lemon yellow, being a complex color generated by the mixture of the basic colors $R_{233}G_{228}B_{000}$; and the "0000001" in the sixth group of the third set of binary information in the data string associated with video frame $F_1$ identifies the time $t_1$ when the Static Video Player 320 is to commence to display said shade of lemon yellow ($R_{233}G_{228}B_{000}$) within pixel $h_{11}l_{20}$ on a Video Output Device 390 and continue to replicate said shade of lemon yellow ($R_{233}G_{228}B_{000}$) within pixel $h_{11}l_{20}$ on a Video Output Device 390 during all subsequent video frames until instructed otherwise, and in this example those video frames are $F_2$, $F_3$, $F_4$, $F_5$, $F_6$, $F_7$, and $F_8$. The Static Video File 310 is saved in the hard disk of the host computer system containing the Static Video Player 320 and the Static Video File 350 is saved in the hard disk of the computer system containing the Static Video Player 330.

The Static Video Player 320 is a computer software program saved in the hard disk of the host computer system. When the Static Video Player 320 is activated, the central processing unit of the host computer system transmits a copy of the program to random access memory within the host computer system for execution of the various functions of the Static Video Player 320, as is convention with most computer software programs. The Static Video Player 320 accesses the Static Video File 310 and replicates and saves color information from the Static Video File 310 into a video frame buffer memory within the Static Video Player 320. The Static Video Player 320 then transmits said color information from said video frame buffer memory to the red/green/blue memory registers within the Static Video Player 320, one video frame at a time. As example, the Static Video Player 320 accesses the Static Video File 310 and invokes a serial data replication of the color information related to the first video frame into a red/green/blue matrix within a video frame buffer memory within the Static Video Player 320. The Static Video Player 320 then invokes a parallel data dump (i.e. a data dump is the process whereby data in a buffer memory is electronically transmitted to another mechanism or memory then is electronically erased from said buffer memory) of said color information related to the first video frame from said video frame buffer memory to the red/green/blue memory registers within the Static Video Player 320. The Static Video Player 320 then invokes a parallel data dump of said color information related to the first video frame from said video frame buffer memory to said red/green/blue memory registers. As the Static Video Player 320 invokes a parallel data dump of said color information related to the first video frame from said video frame buffer memory to said red/green/blue memory registers, the Static Video Player 320 accesses the Static Video File 310 and invokes a serial data replication of the color information related to the second video frame into said red/green/blue memory matrix within said video frame buffer memory within the Static Video Player 320. As the Static Video Player 320 invokes a parallel data dump of the color information related to the first video frame from said red/green/blue memory registers to a video card buffer memory within the Static Video Player 320 (as discussed herein below) the Static Video Player 320 invokes a parallel data dump of said color information related to the second video frame from said video frame buffer memory to said red/green/blue memory registers. The color information in the third video frame, forth video frame, fifth video frame, etc. will continue in the above manner until the end of the Static Video File 310.

As mentioned above, the Static Video Player 320 saves color information from the Static Video File 310 into a matrix video memory registers $r_{x/y}g_{x/y}b_{x/y}$ within the Static Video Player 320, where $r_{x/y}$ represents memory registers for the basic color red, $g_{x/y}$ represents memory registers for the basic color green, and $b_{x/y}$ represents memory registers for the basic color blue. The video memory registers $r_{x/y}g_{x/y}b_{x/y}$ correspond to each such previously defined pixel $h_x l_y$, and subscript "x/y" of said memory registers corresponds to the subscripts "x" and "y" of each such pixel $h_x l_y$. It is important to note that if any of the video memory registers $r_{x/y}g_{x/y}b_{x/y}$ do not receive a data dump for any particular video frame $F_w$, those such video memory registers $r_{x/y}g_{x/y}b_{x/y}$ will not be modified for any such video frame $F_w$. Furthermore, once a specific color $R_v G_v B_v$ has been saved in a memory register $r_{x/y}g_{x/y}b_{x/y}$, corresponding to a pixel $h_x l_y$ of a Video Output Device 390, the Static Video Player 320 does not need to receive any further color information from the Static Video File 310 to enable the Static Video Player 320 to continue to display, and/or replicate, said specific color $R_v G_v B_v$ within said pixel $h_x l_y$ of a Video Output Device 390. The Static Video Player 320 saves the $R_v G_v B_v$ color information from the Static Video File 310 into the corresponding video memory registers $r_{x/y}g_{x/y}b_{x/y}$, with respect to time, and corresponding to pixel $h_x l_y$ of a Video Output Device 390. Using the previous example where the Static Video File 310 mathematically represents a video recording as the algorithm "$F_w = h_x l_y R_v G_v B_v t_z$" and expressed in binary terms as: $F_1$=00001 00001 01110100 00000000 01011111 0000001 00100 00111 01001010 11111111 00000000 0000001 01011 10100 11101001 11100100 00000000 0000001; $F_6$=00100 00111 10001110 11000011 11101000 0000110; $F_8$=00001 00001 00000000 10001100 01110110 0001000; which mathematically represents a video recording whereby a shade of purple ($R_{116}G_{000}B_{095}$) is to be displayed within pixel $h_1 l_1$ of a Video Output Device 390 in video frames $F_1$, $F_2$, $F_3$, $F_4$, $F_5$, $F_6$, and $F_7$, then in video frame $F_8$ a shade of teal ($R_{000}G_{140}B_{118}$) is to be displayed within pixel $h_1 l_1$; a shade of lime green ($R_{074}G_{255}B_{000}$) is to be displayed within pixel $h_4 l_7$ on a Video Output Device 390 in video frames $F_1$, $F_2$, $F_3$, $F_4$, and $F_5$, then in video frames $F_6$, $F_7$, and $F_8$ a shade of powder blue ($R_{142}G_{195}B_{232}$) is to be displayed within pixel $h_4 l_7$; and a shade of lemon yellow ($R_{233}G_{228}B_{000}$) is to be displayed within pixel $h_{11} l_{20}$ on a Video Output Device 390 in video frames $F_1$, $F_2$, $F_3$, $F_4$, $F_5$, $F_6$, $F_7$, and $F_8$ (see FIG. 18). As further clarification, said pixels $h_1 l_1$, $h_4 l_7$, and $h_{11} l_{20}$ are discussed below, detailing the process the Static Video Player 320 utilizes to replicate color information from the Static Video File 310 to the red/green/blue memory registers within the Static Video Player 320. The "00001 00001" in the first and second groups of the first set of binary information in the data string associated with video frame $F_1$ identify pixel $h_1 l_1$; the "01110100 00000000 01011111" in the third, fourth, and fifth groups of the first set of binary information in the data string associated with video frame $F_1$ identify a shade of purple, being a complex color generated by the mixture of the basic colors $R_{116}G_{000}B_{095}$; and the "0000001" in the sixth group of the first set of binary information in the data string associated with video frame $F_1$ identifies the time $t_1$ when the Static Video Player 320 is to save the purple ($R_{116}G_{000}B_{095}$) color information into memory registers $r_{1/1}g_{1/1}b_{1/1}$ and upon commencing the sequential serial transmission of color information by video frame from the Static Video File 310, the Static Video Player 320 replicates and saves color information related to video frame $F_1$ from the Static Video File 310 into the video frame buffer memory, including said "01110100 00000000 01011111" in said third, fourth, and fifth groups of said first set of binary information in said data string associated with video frame $F_1$, and then the Static Video Player 320 invokes a parallel data dump of all color information related to video frame $F_1$ from the video frame buffer memory to the red/green/blue memory registers, including said "01110100 00000000 01011111" in said third, fourth, and fifth groups of said first set of binary information in said data string associated with video frame $F_1$ which is saved in the $r_{1/1}g_{1/1}b_{1/1}$ memory register within the Static Video Player 320 at time $t_1$. The "00001 00001" in the first and second groups of the only set of binary information in the data string associated with video frame $F_8$ identify pixel $h_1 l_1$; the "00000000 10001100 01110110" in the third, fourth, and fifth groups of the only set of binary information in the data string associated with video frame $F_8$ identify a shade of teal, being a complex color generated by the mixture of the basic colors $R_{000}G_{140}B_{118}$; and the "0001000" the sixth group of the only set of binary information in the data string associated with video frame $F_8$ identifies the time $t_8$ when the Static Video Player 320 is to save the teal ($R_{000}G_{140}B_{118}$) color information into memory registers $r_{1/1}g_{1/1}b_{1/1}$, and when the sequential serial transmission of color information by video frame reaches the point when color information related to video frame $F_8$ is to be accessed from the Static Video File 310, the Static Video Player 320 replicates and saves color information related to video frame $F_8$ from the Static Video File 310 into the video frame buffer memory, including said "00000000 10001100 01110110" in said third, fourth, and fifth groups of the only set of binary information in the data string associated with video frame $F_8$, and then the Static Video Player 320 invokes a parallel data dump of all color information related to video frame $F_8$ from the video frame buffer memory to the red/green/blue memory registers, including said "00000000 10001100 01110110" in said third, fourth, and fifth groups of the only set of binary information in the data string associated with video frame $F_8$, which is saved in the $r_{1/1}g_{1/1}b_{1/1}$ memory register within the Static Video Player 320 at time $t_8$. The "00100 00111" in the first and second groups of the second set of binary information in the data string associated with video frame $F_1$ identify pixel $h_4 l_7$; the "01001010 11111111 00000000" in the third, fourth, and fifth groups of the second set of binary information in the data string associated with video frame $F_1$ identify a shade of lime green, being a complex color generated by the mixture of the basic colors $R_{074}G_{255}B_{000}$; and the "0000001" in the sixth group of the second set of binary information in the data string associated with video frame $F_1$ identifies the time $t_1$ when the Static Video Player 320 is to save the lime green ($R_{074}G_{255}B_{000}$) color information into memory registers $r_{4/7}g_{4/7}b_{4/7}$ and upon commencing the sequential serial transmission of color information by video frame from the Static Video File 310, the Static Video Player 320 replicates and saves color information related to video frame $F_1$ from the Static Video File 310 into the video frame buffer memory, including said "01001010 11111111 00000000" in said third, fourth, and fifth groups of said second set of binary information in said data string associated with video frame $F_1$, and then the Static Video Player 320 invokes a parallel data dump of all color information related to video frame $F_1$ from the video frame buffer memory to the red/green/blue memory registers, including said "01001010 11111111 00000000" in said third, fourth, and fifth groups of said second set of binary information in said data string associated with video frame $F_1$, which is saved in the $r_{4/7}g_{4/7}b_{4/7}$ memory register within the Static Video Player 320 at time $t_1$. The "00100 00111" in the first and second groups of the only set of binary information in the data string associated with video frame $F_6$ identify pixel $h_4 l_7$;

the "10001110 11000011 11101000" in the third, fourth, and fifth groups of the only set of binary information in the data string associated with video frame $F_6$ identify a shade of powder blue, being a complex color generated by the mixture of the basic colors $R_{142}G_{195}B_{232}$; and the "000011O" the sixth group of the only set of binary information in the data string associated with video frame $F_6$ identifies the time $t_6$ when the Static Video Player 320 is to save the powder blue ($R_{142}G_{195}B_{232}$) color information into memory registers $r_{4/7}g_{4/7}b_{4/7}$, and when the sequential serial transmission of color information by video frame reaches the point when color information related to video frame $F_6$ is to be accessed from the Static Video File 310, the Static Video Player 320 replicates and saves color information related to video frame $F_6$ from the Static Video File 310 into the video frame buffer memory, including said "10001110 11000011 11101000" in said third, fourth, and fifth groups of the only set of binary information in the data string associated with video frame $F_6$, and then the Static Video Player 320 invokes a parallel data dump of all color information related to video frame $F_6$ from the video frame buffer memory to the red/green/blue memory registers, including said "10001110 11000011 11101000" in said third, fourth, and fifth groups of the only set of binary information in the data string associated with video frame $F_6$, which is saved in the $r_{4/7}g_{4/7}b_{4/7}$ memory register within the Static Video Player 320 at time $t_6$. The "01011 10100" in the first and second groups of the third set of binary information in the data string associated with video frame $F_1$ identify pixel $h_{11}l_{20}$; the "11101001 11100100 00000000" in the third, fourth, and fifth groups of the third set of binary information in the data string associated with video frame $F_1$ identify a shade of lemon yellow, being a complex color generated by the mixture of the basic colors $R_{233}G_{228}B_{000}$; and the "0000001" in the sixth group of the third set of binary information in the data string associated with video frame $F_1$ identifies the time $t_1$ when the Static Video Player 320 is to save the lemon yellow ($R_{233}G_{228}B_{000}$) color information into memory registers $r_{11/20}g_{11/20}b_{11/20}$, and upon commencing the sequential serial transmission of color information by video frame from the Static Video File 310, the Static Video Player 320 replicates and saves color information related to video frame $F_1$ from the Static Video File 310 into the video frame buffer memory, including said "11101001 11100100 00000000" in said third, fourth, and fifth groups of said third set of binary information in said data string associated with video frame $F_1$, and then the Static Video Player 320 invokes a parallel data dump of all color information related to video frame $F_1$ from the video frame buffer memory to the red/green/blue memory registers, including said "11101001 11100100 00000000" in said third, fourth, and fifth groups of said third set of binary information in said data string associated with video frame $F_1$ which is saved in the $r_{11/20}g_{11/20}b_{11/20}$ memory register within the Static Video Player 320 at time $t_1$.

Additionally, the invention utilizes the Static Video Player 320 to display, and/or replicate, color information saved from the Static Video File 350 into the red/green/blue memory registers in the Static Video Player 320 in a similar manner as mentioned above for the color information received by the Static Video Player 320 by the Static Video File 310. The Static Video Player 320 may receive color information from the Static Video File 350 via the Electronic Connection 340 in a download fashion or in a broadcast fashion. As example, in a download transmission, a sending computer system may create an electronic copy of a Static Video File 350 and transmit said Static Video File 350 serially by means of a conventional modem electronically connected to the Electronic Connection 340 and received by a receiving computer system by means of a conventional modem electronically connected to the Electronic Connection 340 and electronically stored in the hard disk of the receiving computer system (i.e. U.S. Pat. No. 5,191,573). Also as example, in a broadcast transmission, a sending computer system may create an electronic copy of a Static Video File 350 and transmit said Static Video File 350 serially, and at the normal display rate of the video recording, by means of a conventional modem electronically connected to the Electronic Connection 340 and received by a receiving computer system by means of a conventional modem electronically connected to the Electronic Connection 340 and subsequently transmitted by the receiving computer system to the video card of the receiving computer system for display on the Video Output Device 390.

When the Static Video Player 320 commences the display, and/or replication, process, whatever $R_vG_vB_v$ color information has been saved within the video memory registers $r_{x/y}g_{x/y}b_{x/y}$ will be displayed, and/or replicated, within the corresponding $h_xl_y$ pixel on the Video Output Device 390. For each video frame $F_z$, the Static Video Player 320 first saves any new $R_vG_vB_v$ color information into the video memory registers $r_{x/y}g_{x/y}b_{x/y}$, then the Static Video Player 320 displays complex colors, as generated by the color information in the video memory registers $r_{x/y}g_{x/y}b_{x/y}$, within the corresponding pixels $h_xl_y$ on the Video Output Device 390 at time $t_z$ corresponding to video frame $F_w$. For any video frame $F_w$, if any memory register $r_{x/y}g_{x/y}b_{x/y}$ is not updated by the Static Video Player 320 with new $R_vG_vB_v$ color information from the Static Video File 310, then the $R_vG_vB_v$ color information within any such memory register $r_{x/y}g_{x/y}b_{x/y}$ will not be altered until the Static Video Player 320 receives updated $R_vG_vB_v$ color information from the Static Video File 310 corresponding to said memory register $r_{x/y}g_{x/y}b_{x/y}$. The Static Video Player 320 sequentially replicates, one video frame at a time, the color information contained in all of the red/green/blue memory registers into a video card buffer memory within the Static Video Player 320. The Static Video Player 320 then transmits said color information to the video card of the host computer. Upon receipt of the color information, said video card transmits said color information to the Video Output Device 390 for display. As example, the Static Video Player 320 invokes a parallel data dump of the color information related to the first video frame from the red/green/blue memory registers to a video card buffer memory within the Static Video Player 320. Next, the Static Video Player 320 accesses the video card buffer memory, sequentially by video frame and at the intended playback rate (i.e. 30 video frames per second for motion picture quality recordings), and invokes a parallel data dump of all of the color information related to said first video frame to said video card through an electronic connecting bus. Upon receipt of the color information related to said first video frame, said video card will transmit/relay, in either digital form or analog form, the color information related to said first video frame to the Video Output Device 390 for display. While the Static Video Player 320 invokes a parallel data replication of the color information related to said first video frame from the red/green/blue memory registers to said video card buffer memory, the Static Video Player 320 invokes a parallel data dump of the color information related to the second video frame from the video frame buffer memory (as mentioned hereinabove) to said red/green/blue memory registers. Then, while the Static Video Player 320 invokes a parallel data dump of the color information related to said first video frame from said video card buffer memory to said video card, the Static Video Player 320 invokes a parallel data replication of the color information related to the second video frame from said red/green/blue memory registers to said video card buffer memory. Then, while said video card transmits/relays the color information related to said first video frame to the Video Output Device 390 for display, the Static Video Player 320 invokes a parallel data dump of the color information related to said second video frame from said video card buffer memory to said video card through said electronic connecting bus. Upon receipt of the color information related to said second video frame, said video card will transmit/relay, in either digital form or analog form, the color information related to said second video frame to the Video Output Device 390 for display. The color information in the third video frame, forth video frame, fifth video frame, etc. will continue in the above manner until the end of the Static Video File 310.

Figure 11:
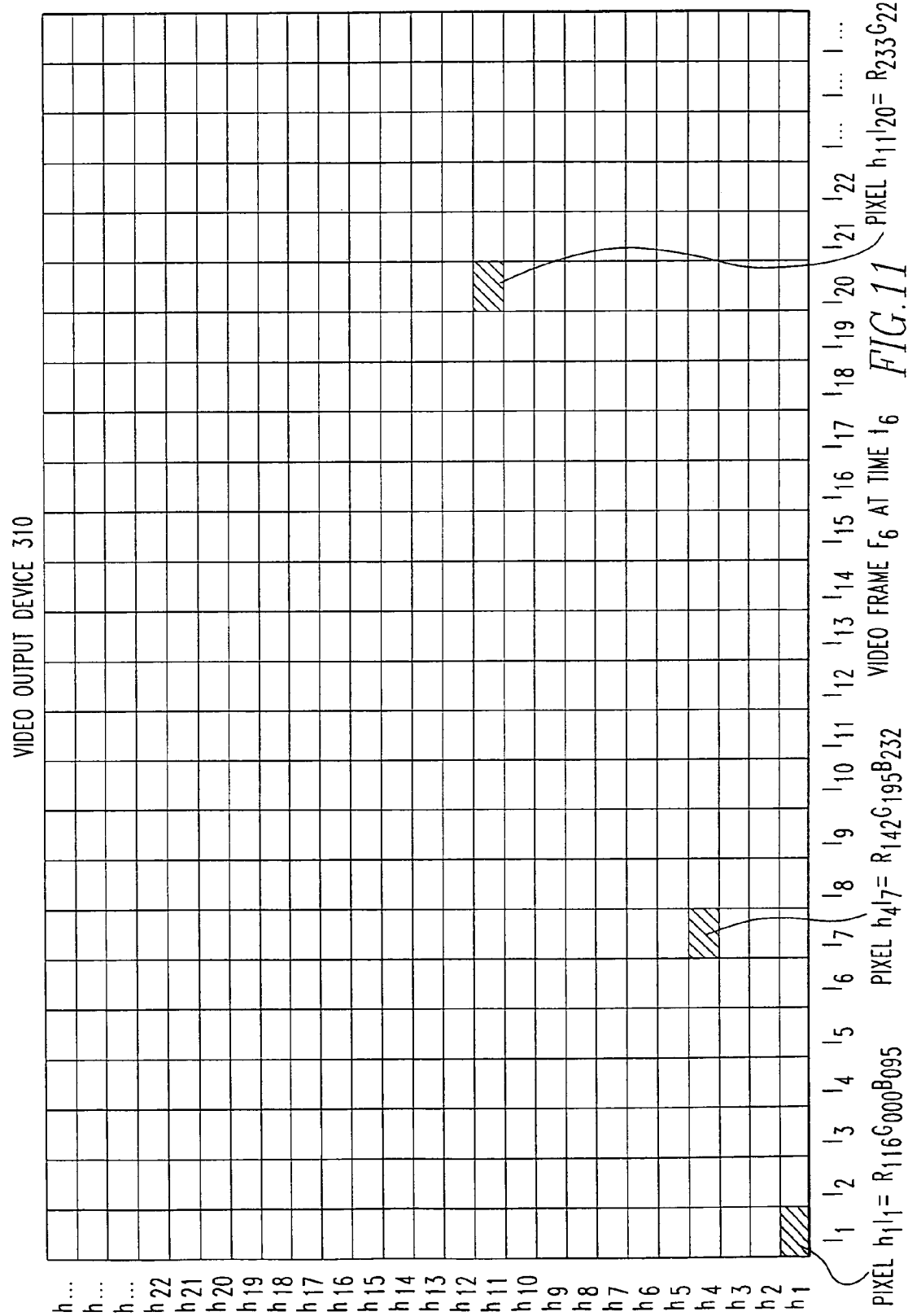
FIG. 11 is a pictorial representation of the playback of a video frame $F_6$ of a Static Video File 310 in which a shade of purple ($R_{116}G_{000}B_{095}$) is to be displayed within pixel $h_1l_1$; a shade of powder blue ($R_{142}G_{195}B_{232}$) is to be displayed within pixel $h_4l_7$; and a shade of lemon yellow ($R_{233}G_{228}B_{000}$) is to be displayed within pixel $h_{11}l_{20}$ on a Video Output Device 390.

Additionally, the Static Video Player 320 is capable of displaying, and/or replicating, color information in either digital video form or analog video form on the Video Output Device 390 within pixels $h_x l_y$ corresponding to said video memory registers $r_{x/y} g_{x/y} b_{x/y}$. Again, using the previous example where the Static Video File 310 mathematically represents a video recording as the algorithm "$F_w = h_x l_y R_v G_v B_v t_z$" and expressed in binary terms as: $F_1$=00001 00001 01110100 00000000 01011111 0000001 00100 00111 01001010 11111111 00000000 0000001 01011 10100 11101001 11100100 00000000 0000001; $F_6$=00100 00111 10001110 11000011 11101000 0000110; $F_8$=00001 00001 00000000 10001100 01110110 0001000; which mathematically represents a video recording (see FIG. 19) whereby a shade of purple ($R_{116} G_{000} B_{095}$) is to be displayed within pixel $h_1 l_1$ of a Video Output Device 390 in video frames $F_1$, $F_2$, $F_3$, $F_4$, $F_5$, $F_6$, and $F_7$, then in video frame $F_8$ a shade of teal ($R_{000} G_{140} B_{118}$) is to be displayed within pixel $h_1 l_1$; a shade of lime green ($R_{074} G_{255} B_{000}$) is to be displayed within pixel $h_4 l_7$ on a Video Output Device 390 in video frames $F_1$, $F_2$, $F_3$, $F_4$, and $F_5$, then in video frames $F_6$, $F_7$, and $F_8$ a shade of powder blue ($R_{142} G_{195} B_{232}$) is to be displayed within pixel $h_4 l_7$; and a shade of lemon yellow ($R_{233} G_{228} B_{000}$) is to be displayed within pixel $h_{11} l_{20}$ on a Video Output Device 390 in video frames $F_1$, $F_2$, $F_3$, $F_4$, $F_5$, $F_6$, $F_7$, and $F_8$ (see FIG. 11). The "00001 00001" in the first and second groups of the first set of binary information in the data string associated with video frame $F_1$ identify pixel $h_1 l_1$; the "01110100 00000000 01011111" in the third, fourth, and fifth groups of the first set of binary information in the data string associated with video frame $F_1$ identify a shade of purple, being a complex color generated by the mixture of the basic colors $R_{116} G_{000} B_{095}$; and the "0000001" in the sixth group of the first set of binary information in the data string associated with video frame $F_1$ identifies the time $t_1$ when the Static Video Player 320 will commence to display within pixel $h_1 l_1$ on the Video Output Device 390 commencing with video frame $F_1$ said shade of purple ($R_{116} G_{000} B_{095}$), as saved in time $t_1$ in the $r_{1/1} g_{1/1} b_{1/1}$ memory registers which correspond to said pixel $h_1 l_1$, and the Static Video Player 320 will continue to display said shade of purple ($R_{116} G_{000} B_{095}$) within pixel $h_1 l_1$ on the Video Output Device 390 during video frames $F_2$, $F_3$, $F_4$, $F_5$, $F_6$, and $F_7$ since the Static Video File 310 does not have instructions for the Static Video Player 320 to alter said $r_{1/1} g_{1/1} b_{1/1}$ memory registers during times $t_2$, $t_3$, $t_4$, $t_5$, $t_6$, and $t_7$. Upon commencing the sequential parallel data replication of color information by video frame from the red/green/blue memory registers to the video card buffer memory, the Static Video Player 320 invokes a sequential parallel data replication of color information related to video frame $F_1$ from the red/green/blue memory registers into the video card buffer memory, including said "01110100 00000000 01011111" in the $r_{1/1} g_{1/1} b_{1/1}$ memory register.

Next, the Static Video Player 320 invokes a parallel data dump of color information related to video frame $F_1$ from the video card buffer memory to the video card within the host computer system, including said "01110100 00000000 01011111" related to said pixel $h_1 l_1$ in video frame $F_1$. Next, the video card relays/transmits said color information related to video frame $F_1$ to the corresponding pixels $h_x l_y$ of the Video Output Device 390, including said shade of purple ($R_{116} G_{000} B_{095}$) to commence to be displayed within pixel $h_1 l_1$ of the Video Output Device 390 time $t_1$. The "00001 00001" in the first and second groups of the first set of binary information in the data string associated with video frame $F_8$ identify pixel $h_1 l_1$; the "00000000 10001100 01110110" in the third, fourth, and fifth groups of the first set of binary information in the data string associated with video frame $F_8$ identify a shade of teal, being a complex color generated by the mixture of the basic colors $R_{000} G_{140} B_{118}$; and the "0001000" in the sixth group of the first set of binary information in the data string associated with video frame $F_8$ identifies the time $t_8$ when the Static Video Player 320 will commence to display within pixel $h_1 l_1$ on the Video Output Device 390 commencing with video frame $F_8$ said shade of teal ($R_{000} G_{140} B_{118}$), as saved in time $t_8$ in the $r_{1/1} g_{1/1} b_{1/1}$ memory registers which correspond to said pixel $h_1 l_1$. When the sequential parallel data replication of color information by video frame reaches the point when color information related to video frame $F_8$ is to be replicated to the video card buffer memory, the Static Video Player 320 invokes a sequential parallel data replication of color information related to video frame $F_8$ from the red/green/blue memory registers into the video card buffer memory, including said "00000000 10001100 01110110" in the $r_{1/1} g_{1/1} b_{1/1}$ memory register. Next, the Static Video Player 320 invokes a parallel data dump of color information related to video frame $F_8$ from the video card buffer memory to the video card within the host computer system, including said "00000000 10001100 01110110" related to said pixel $h_1 l_1$ in video frame $F_8$. Next, the video card relays/transmits said color information related to video frame $F_8$ to the corresponding pixels $h_x l_y$ of the Video Output Device 390, including said shade of teal ($R_{000} G_{140} B_{118}$) to commence to be displayed within pixel $h_1 l_1$ of the Video Output Device 390 in time $t_8$. The "00100 00111" in the first and second groups of the second set of binary information in the data string associated with video frame $F_1$ identify pixel $h_4 l_7$; the "01001010 11111111 00000000" in the third, fourth, and fifth groups of the second set of binary information in the data string associated with video frame $F_1$ identify a shade of lime green, being a complex color generated by the mixture of the basic colors $R_{074} G_{255} B_{000}$; and the "0000001" in the sixth group of the second set of binary information in the data string associated with video frame $F_1$ identifies the time $t_1$ when the Static Video Player 320 will commence to display within pixel $h_4 l_7$ on the Video Output Device 390 commencing with video frame $F_1$ said shade of lime green ($R_{074} G_{255} B_{000}$), as saved in time $t_1$ in the $r_{4/7} g_{4/7} b_{4/7}$ memory registers which correspond to said pixel $h_4 l_7$, and the Static Video Player 320 will continue to display said shade of lime green ($R_{074} G_{255} B_{000}$) within pixel $h_4 l_7$ on the Video Output Device 390 during video frames $F_2$, $F_3$, $F_4$, and $F_5$ since the Static Video File 310 does not have instructions for the Static Video Player 320 to alter said $r_{4/7} g_{4/7} b_{4/7}$ memory registers during times $t_2$, $t_3$, $t_4$, and $t_5$. Upon commencing the sequential parallel data replication of color information by video frame from the red/green/blue memory registers to the video card buffer memory, the Static Video Player 320 invokes a sequential parallel data replication of color information related to video frame $F_1$ from the red/green/blue memory registers into the video card buffer memory, including said "01001010 11111111 00000000" in the $r_{4/7}g_{4/7}b_{4/7}$ memory register. Next, the Static Video Player 320 invokes a parallel data dump of color information related to video frame $F_1$ from the video card buffer memory to the video card within the host computer system, including said "01001010 11111111 00000000" related to said pixel $h_4l_7$ in video frame $F_1$. Next, the video card relays/transmits said color information related to video frame $F_1$ to the corresponding pixels $h_xl_y$ of the Video Output Device 390, including said shade of lime green $(R_{074}G_{255}B_{000})$ to commence to be displayed within pixel $h_4l_7$ of the Video Output Device 390 time $t_1$. The "00100 00111" in the first and second groups of the only set of binary information in the data string associated with video frame $F_6$ identify pixel $h_4l_7$; the "10001110 11000011 11101000" in the third, fourth, and fifth groups of the only set of binary information in the data string associated with video frame $F_6$ identify a shade of powder blue, being a complex color generated by the mixture of the basic colors $R_{142}G_{195}B_{232}$; and the "0000110" in the sixth group of the only set of binary information in the data string associated with video frame $F_6$ identifies the time $t_6$ when the Static Video Player 320 will commence to display within pixel $h_4l_7$ on the Video Output Device 390 commencing with video frame $F_6$ said shade of powder blue $(R_{142}G_{195}B_{232})$, as saved in time $t_6$ in the $r_{4/7}g_{4/7}b_{4/7}$ memory registers which correspond to said pixel $h_4l_7$, and the Static Video Player 320 will continue to display said shade of powder blue $(R_{142}G_{195}B_{232})$ within pixel $h_4l_7$ on the Video Output Device 390 during video frames $F_7$ and $F_8$ since the Static Video File 310 does not have instructions for the Static Video Player 320 to alter said $r_{4/7}g_{4/7}b_{4/7}$ memory registers during times $t_7$ and $t_8$. When the sequential parallel data replication of color information by video frame reaches the point when color information related to video frame $F_6$ is to be replicated to the video card buffer memory, the Static Video Player 320 invokes a sequential parallel data replication of color information related to video frame $F_8$ from the red/green/blue memory registers into the video card buffer memory, including said "10001110 11000011 11101000" in the $r_{4/7}g_{4/7}b_{4/7}$ memory register. Next, the Static Video Player 320 invokes a parallel data dump of color information related to video frame $F_6$ from the video card buffer memory to the video card within the host computer system, including said "10001110 11000011 11101000" related to said pixel $h_4l_7$ in video frame $F_6$. Next, the video card relays/transmits said color information related to video frame $F_6$ to the corresponding pixels $h_xl_y$ of the Video Output Device 390, including said shade of powder blue $(R_{142}G_{195}B_{232})$ to commence to be displayed within pixel $h_4l_7$ of the Video Output Device 390 in time $t_6$. The "01011 10100" in the first and second groups of the third set of binary information in the data string associated with video frame $F_1$ identify pixel $h_{11}l_{20}$; the "11101001 11100100 00000000" in the third, fourth, and fifth groups of the third set of binary information in the data string associated with video frame $F_1$ identify a shade of lemon yellow, being a complex color generated by the mixture of the basic colors $R_{233}G_{228}B_{000}$; and the "0000001" in the sixth group of the third set of binary information in the data string associated with video frame $F_1$ identifies the time $t_1$ when the Static Video Player 320 will commence to display within pixel $h_{11}l_{20}$ on the Video Output Device 390 commencing with video frame $F_1$ said shade of lemon yellow $(R_{233}G_{228}B_{000})$, as saved in time $t_1$ in the $r_{11/20}g_{11/20}b_{11/20}$ memory registers which correspond to said pixel $h_{11}l_{20}$, and the Static Video Player 320 will continue to display said shade of lemon yellow $(R_{233}G_{228}B_{000})$ within pixel $h_{11}l_{20}$ on the Video Output Device 390 during video frames $F_2$, $F_3$, $F_4$, $F_5$, $F_6$, $F_7$, and $F_8$ since the Static Video File 310 does not have instructions for the Static Video Player 320 to alter said $r_{11/20}g_{11/20}b_{11/20}$ memory registers during times $t_2$, $t_3$, $t_4$, $t_5$, $t_6$, $t_7$, and $t_8$. Upon commencing the sequential parallel data replication of color information by video frame from the red/green/blue memory registers to the video card buffer memory, the Static Video Player 320 invokes a sequential parallel data replication of color information related to video frame $F_1$ from the red/green/blue memory registers into the video card buffer memory, including said "11101001 11100100 00000000" in the $r_{11/20}g_{11/20}b_{11/20}$ memory register. Next, the Static Video Player 320 invokes a parallel data dump of color information related to video frame $F_1$ from the video card buffer memory to the video card within the host computer system, including said "11101001 11100100 00000000" related to said pixel $h_{11}l_{20}$ in video frame $F_1$. Next, the video card relays/transmits said color information related to video frame $F_1$ to the corresponding pixels $h_xl_y$ of the Video Output Device 390, including said shade of lime green $(R_{074}G_{255}B_{000})$ to commence to be displayed within pixel $h_{11}l_{20}$ of the Video Output Device 390 time $t_1$.

As discussed above, the color information saved in the $r_{1/1}g_{1/1}b_{1/1}$ memory registers within in the Static Video Player 320 can be obtained from the Static Video File 310 one video frame at a time during real-time playback of the video recording or the Static Video Player 320 can obtain and schedule color information changes for all video frames $F_w$ in the video recording, by pixel $h_xl_y$ from the Static Video File 310 at, or before, the commencement of playback of the video recording, or a combination thereof.

Furthermore, and as example, if the Static Video Player 320 is displaying within a pixel $h_xl_y$ on a Video Output Device 390 a complex color, and the difference between said complex color and the new complex color is due only to a change in the shade of the basic color green $G_y$, and the shades of the basic colors red $R_y$ and blue $B_y$ do not change, then the Static Video File 310 could only be required to contain new information as to the basic color green $G_y$, and the Static Video Player 320 could only be required to replace the green $g_{x/y}$ memory register within the Static Video Player 320 related to said pixel $h_xl_y$, with the green color information $G_y$ from the Static Video File 310, thereby enabling the Static Video Player 320 to subsequently display, and/or replicate, the new specific complex color within said pixel $h_xl_y$ on the Video Output Device 390.

Additionally, the Static Video Player 320 can be configured to contain one or more memory registers corresponding to each discrete pixel $h_xl_y$, in which information from the Static Video File 310 can be saved. As example, the red/green/blue information may be configured to be saved in only one memory register corresponding with a pixel $h_xl_y$ rather than to the individual $r_{1/1}g_{1/1}b_{1/1}$ memory registers.

Additionally, if a video recording contains a situation in which a specific color is to be displayed within a plurality of contiguous pixels, forming a geometric shape, on a Video Output Device 390 commencing with a specific video frame $F_w$, instead of recording the entire volume of said geometric shape within the Static Video File 310, only the corners (either interior or exterior corners) of said geometric shape could be recorded within the Static Video File 310 along with information instructing the Static Video Player 320 to colorized with said specific color the pixels $h_xl_y$ within said geometric shape. By means of example (see Geometric Shape 1 in FIG. 20), video frame $F_{56}$ of a video recording contains a grouping of contiguous pixels which form a rectangle (Geometric Shape 1) with corners located at pixels $h_3l_5$, $h_3l_{18}$, $h_8l_{18}$, and $h_8l_5$ in which the complex color red ($R_{255}G_{000}B_{000}$) is to commence to be displayed in time $t_{56}$. The color information within the Static Video File 310, with respect to said red colored rectangle within said video frame $F_{56}$ is encoded to contain only said 4 corner pixels $h_3l_5$, $h_3l_{18}$, $h_8l_{18}$, and $h_8l_5$, instead of the 84 individual pixels within the volume of said red ($R_{255}G_{000}B_{000}$) rectangle, and the Static Video Player 320 would save the complex color red ($R_{255}G_{000}B_{000}$) in the video memory registers $r_{x/y}g_{x/y}b_{x/y}$ corresponding to all pixels within the volume of the rectangle defined by the corners occupying pixels $h_3l_5$, $h_3l_{18}$, $h_8l_{18}$, and $h_8l_5$. To accomplish this, the algorithm "$F_x=h_xl_yR_vG_vB_vt_z$" as used in the previous example detailing how a Static Video File 310 could be encoded, would be modified to become the algorithm "$F_x=h_xl_y \ldots h_xl_yS_jR_vG_vB_vt_z$" where the "$h_xl_y \ldots h_xl_y$" identifies an unlimited plurality, or groupings, of pixels within a set of binary information in a data string associated with a video frame $F_{56}$, and the "$S_0$" identifies a code, expressed in binary terms as $S_0=0000000000$, which informs the Static Video Player 320 that the preceding groups of data identified the pixels which correspond to the corners of the red rectangle. Therefore, said algorithm "$F_x=h_xl_y \ldots h_xl_yS_0R_vG_vB_vt_z$" for the preceding Geometric Shape 1 would be mathematically expressed as "$F_{56}=h_3l_5h_3l_{18}h_8l_{18}h_8l_5S_0R_{255}G_{000}B_{000}t_{56}$" and would be expressed in binary terms as: $F_{56}$=00000011 00000101 00000011 00010010 00001000 00010010 00001000 00000101 0000000000 11111111 00000000 00000000 0111000. Again by means of example (see Geometric Shape 2 in FIG. 20), video frame $F_{56}$ of a video recording contains a grouping of contiguous pixels which form an irregularly shaped polygon with corners located at pixels $h_{12}l_3$, $h_{12}l_4$, $h_{15}l_4$, $h_{15}l_7$, $h_{14}l_7$, $h_{14}l_8$, $h_{17}l_8$, $h_{17}l_6$, $h_{20}l_6$, $h_{20}l_5$, $h_{16}l_5$, and $h_{16}l_3$ in which the complex color blue ($R_{000}G_{000}B_{255}$) is to commence to be displayed in time $t_{56}$. The color information within the Static Video File 310, with respect to said blue colored irregularly shaped polygon within said video frame $F_{56}$ is encoded to contain only said 12 corner pixels $h_{12}l_3$, $h_{12}l_4$, $h_{15}l_4$, $h_{15}l_7$, $h_{14}l_7$, $h_{14}l_8$, $h_{17}l_8$, $h_{17}l_6$, $h_{20}l_6$, $h_{20}l_5$, $h_{16}l_5$, and $h_{16}l_3$, instead of the 30 individual pixels within the volume of said blue ($R_{000}G_{000}B_{255}$) irregularly shaped polygon (Geometric Shape 2), and the Static Video Player 320 would save the complex color blue ($R_{000}G_{000}B_{255}$) in the video memory registers $r_{x/y}g_{x/y}b_{x/y}$ corresponding to all pixels within the volume of the irregularly shaped polygon defined by the corners occupying pixels $h_{12}l_3$, $h_{12}l_4$, $h_{15}l_4$, $h_{15}l_7$, $h_{14}l_7$, $h_{14}l_8$, $h_{17}l_8$, $h_{17}l_6$, $h_{20}l_6$, $h_{20}l_5$, $h_{16}l_5$, and $h_{16}l_3$. To accomplish this, the algorithm "$F_x=h_xl_yR_vG_vB_vt_z$" as used in the previous example detailing how a Static Video File 310 could be encoded, would be modified to become the algorithm "$F_x=h_xl_y \ldots h_xl_yS_jR_vG_vB_vt_z$" where the "$h_xl_y \ldots h_xl_y$" identifies an unlimited plurality, or groupings, of pixels within a set of binary information in a data string associated with a video frame $F_{56}$, and the "$S_0$" identifies a code, expressed in binary terms as $S_0=0000000000$, which informs the Static Video Player 320 that the preceding groups of data identified the pixels which correspond to the corners of the blue irregularly shaped polygon. Therefore, said algorithm "$F_x=h_xl_y \ldots h_xl_yS_0R_vG_vB_vt_z$" for the preceding Geometric Shape 2 would be mathematically expressed as "$F_{56}=h_{12}l_3h_{12}l_4h_{15}l_4h_{15}l_7h_{14}l_7h_{14}l_8h_{17}l_8h_{17}l_6h_{20}l_6h_{20}l_5h_{16}l_5h_{16}l_3S_0R_{000}G_{000}B_{255}t_{56}$" and would be expressed in binary terms as: $F_{56}$=00001100 00000011 00001100 00000100 00001111 00000100 00001111 00000111 00001110 00000111 00001110 00001000 00010001 00001000 00010001 00000110 00010100 00000110 00010100 00000101 00010000 00000101

00010000 00000011 0000000000 00000000 00000000 11111111 0111000. Additionally, and to add efficiency to the encoding process, the Static Video File 310 can be structured to accommodate a "layering" or "overlapping" of geometric shapes within an individual video frame $F_w$. The encoding of a single video frame $F_w$ of a Static Video File 310 can be separated into a plurality of video sub frames $F_w^s$, where the superscript "s" identifies a range of video sub frames for said video frame $F_w$. As example, commencing with a specific video frame $F_w$ of a video recording in which a Video Output Device 390 is to display a second specific color within a plurality of contiguous pixels forming a second geometric shape, said second geometric shape being located within a first geometric shape formed by a plurality of contiguous pixels in which a Video Output Device 390 is to display a first specific color, and said second geometric shape occupies some common pixels as does said first geometric shape. To accomplish this, color information related to said first geometric shape is encoded in a video sub frame $F_w^1$ of the Static Video File 310, where the superscript "1" identifies the first layer, or first video sub frame, of video frame $F_w$; next the color information related to said second geometric shape is encoded in a video sub frame $F_w^2$ of the Static Video File 310, where the superscript "2" identifies the second layer, or second video sub frame, of video frame $F_w$. The Static Video Player 320 is capable of building a single video frame $F_w$ from a plurality of video sub frames $F_w^s$, where the superscript "s" identifies a range of video sub frames for a single video frame $F_w$. The Static Video Player 320 invokes a sequential serial transmissions of color information related to said video sub frame $F_w^1$ from the Static Video File 310 into the video frame buffer memory; next the Static Video Player 320 invokes a parallel data dump of color information related to said video sub frame $F_w^1$ from the video frame buffer memory into the red/green/blue memory registers; as the Static Video Player 320 invokes a parallel data dump of color information related to said video sub frame $F_w^1$ from the video frame buffer memory into the red/green/blue memory registers, the Static Video Player 320 also invokes a sequential serial transmissions of color information related to said video sub frame $F_w^2$ from the Static Video File 310 into the video frame buffer memory; before the Static Video Player 320 invokes a parallel data dump of color information related to said video frame $F_w$ from red/green/blue memory registers into the video card buffer memory, the Static Video Player 320 invokes a parallel data dump of color information related to said video sub frame $F_w^2$ from the video frame buffer memory into the red/green/blue memory registers, thus building said video frame $F_w$ in layers. Further detailing this example (see Geometric Shapes 3 & 4 in FIG. 20), video frame $F_{56}$ of a video recording contains two geometric shapes, an irregularly shaped polygon (Geometric Shape 3) and a single pixel (Geometric Shape 4) within said irregularly shaped polygon. An irregularly shaped polygon with corners occupying pixels $h_{12}l_{20}$, $h_{19}l_{20}$, $h_{19}l_{22}$, $h_{20}l_{22}$, $h_{20}l_{19}$, $h_{22}l_{19}$, $h_{22}l_{18}$, $h_{19}l_{18}$, $h_{19}l_{15}$, and $h_{17}l_{15}$ of a Video Output Device 390 in which the complex color green ($R_{000}G_{255}B_{000}$) is to commence to be displayed in time $t_{56}$. Additionally, the complex color black ($R_{000}G_{000}B_{000}$) is to commence to be displayed in a single pixel $h_{18}l_{18}$ of a Video Output Device 390, also in time $t_{56}$. To build video frame $F_{56}$, the algorithm "$F_x=h_xl_y \ldots h_xl_yS_jR_vG_vB_vt_z$" would be used twice with respect to Geometric Shapes 3 & 4. Therefore, video frame $F_{56}$ would be mathematically expressed as "$F_{56}^1=h_{12}l_{20}h_{19}l_{20}h_{19}l_{22}h_{20}l_{22}h_{20}l_{19}h_{22}l_{19}h_{22}l_{18}h_{19}l_{18}h_{19}l_{15}h_{17}l_{15}S_0\ R_{000}G_{255}B_{000}t_{56}=F_{56}^2=h_{18}l_{18}S_0R_{000}\ G_{000}B_{000}t_{56}$" and video frame $F_{56}$ would be expressed in binary terms as: $F_{56}^1$=00001100 00010100 00010011 00010100 00010011

00010110 00010100 00010110 00010100 00010011
00010110 00010011 00010110 00010010 00010011
00010010 00010011 00001111 00010001 00001111
0000000000 00000000 11111111 00000000 0111000;
$F_{56}^2$=00010010 00010010 0000000000 00000000 00000000 00000000 0111000.

The analyzing mechanism for the system above can alternatively include the frequency/amplitude database compiler 80 and the dynamic to static audio truncator 100, or the red/green/blue database compiler 280 and the dynamic to static video truncator 300. The playing mechanism can include a static audio file and a static audio player 120 and an audio output device, or a static video file 310 and a static video player 320 and a video output device.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for manipulating video or audio signals comprising the steps of:
    analyzing a video or audio signal of an earlier time having a size;
    determining which portions of a video or audio signal of a later time have changed compared with the video or audio signal of the earlier time;
    producing a representative signal from and corresponding to the audio or video signal of the later time that identifies the audio or video signal of the later time but has less information than the audio or video signal of the earlier time and is smaller in size than the size of the audio or video signal of the earlier time and has only the portions of the video or audio signal that have changed;
    transmitting to a remote location the representative signal; and
    recreating the audio or video signal of the earlier time from the representative signal at the remote location.

2. An apparatus for manipulating video or audio signals comprising:
    means for analyzing a video or audio signal of an earlier time having a size and determining which portions of a video or audio signal of a later time have changed compared with the video or audio signal of the earlier time;
    means for producing a representative signal from and corresponding to the audio or video signal of the later time that identifies the audio or video signal of the later time but has less information than the audio or video signal of the earlier time and is smaller in size than the size of the audio or video signal of the earlier time, said producing means connected to the analyzing means and has only the portions of the video or audio signal that have changed;
    means for transmitting to a remote location the representative signal, said transmitting means connected to the producing means; and
    means for recreating the audio or video signal from the representative signal at the remote location, said recreating means connected to the transmitting means.

3. An apparatus as described in claim 2 including a memory mechanism.

4. An apparatus as described in claim 3 wherein the recreating means includes means for playing the representative signal.

5. An apparatus as described in claim 4 wherein the producing means includes an identifying means for identifying one or more consecutive sound entries over time for a specific amplitude of a discrete frequency and their respective starting points and ending points with respect to time and one or more consecutive specific color entries for a discrete pixel over multiple and consecutive video frames and their respective starting points with respect to multiple and consecutive video frames.

6. A method as described in claim 1 including the step of converting the audio or video signal into a digital signal.

7. A method as described in claim 6 wherein the recreating step includes the step of playing the audio or video signal.

8. An apparatus for manipulating video or audio signals comprising:
    a memory mechanism;
    means for analyzing a video or audio signal having a size;
    means for producing a representative signal from and corresponding to the audio or video signal that identifies the audio or video signal but has less information than the audio or video signal and is smaller in size than the size of the audio or video signal, said producing means connected to the analyzing means , the producing means includes an identifying means for identifying one or more consecutive sound entries over time for a specific amplitude of a discrete frequency and their respective starting points and ending points with respect to time and one or more consecutive specific color entries for a discrete pixel over multiple and consecutive video frames and their respective starting points with respect to multiple and consecutive video frames;
    means for transmitting to a remote location the representative signal, said transmitting means connected to the producing means; and
    means for recreating the audio or video signal from the representative signal at the remote location, said recreating means connected to the transmitting means, the recreating means includes means for playing the representative signal.

* * * * *